(12) United States Patent
Okuyama et al.

(10) Patent No.: US 7,976,166 B2
(45) Date of Patent: Jul. 12, 2011

(54) OPTICAL SYSTEM FOR IMAGE PROJECTION AND IMAGE PROJECTION APPARATUS INCLUDING A POLARIZATION BEAM SPLITTING SURFACE

(75) Inventors: Atsushi Okuyama, Tokorozawa (JP); Yu Yamauchi, Utsunomiya (JP); Takashi Sudo, Utsunomiya (JP); Ryota Kadowaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 1069 days.

(21) Appl. No.: 11/759,550

(22) Filed: Jun. 7, 2007

(65) Prior Publication Data
US 2007/0291594 A1    Dec. 20, 2007

(30) Foreign Application Priority Data

Jun. 8, 2006 (JP) ................. 2006-159999
Jun. 6, 2007 (JP) ................. 2007-150813

(51) Int. Cl.
*G03B 21/14* (2006.01)
*G03B 21/26* (2006.01)

(52) U.S. Cl. ............ 353/20; 353/22; 353/30
(58) Field of Classification Search ............ 353/50, 353/8, 20, 22, 23, 37, 77, 88, 98, 30, 31, 353/32, 81; 359/237, 246, 443
See application file for complete search history.

(56) References Cited

U.S. PATENT DOCUMENTS

| | | | |
|---|---|---|---|
| 5,371,559 A * | 12/1994 | San-Nohe et al. | 353/31 |
| 6,278,552 B1 * | 8/2001 | Ishihara et al. | 359/619 |
| 6,431,727 B1 | 8/2002 | Sugawara et al. | |
| 6,497,485 B1 * | 12/2002 | Itoh | 353/20 |
| 7,259,032 B2 * | 8/2007 | Murata et al. | 438/26 |
| 2002/0018184 A1 | 2/2002 | Ito | |
| 2002/0060780 A1 * | 5/2002 | Takezawa et al. | 353/53 |

FOREIGN PATENT DOCUMENTS

| | | |
|---|---|---|
| CN | 1307244 A | 8/2001 |
| JP | 04-166823 A | 6/1992 |
| JP | 2000-137290 | 5/2000 |
| JP | 2000-206463 | 7/2000 |
| JP | 2001-083604 | 3/2001 |
| JP | 2004-061569 | 2/2004 |

OTHER PUBLICATIONS

Chinese Patent Office Notification of First Office Action concerning Appln 200710110224.8 dated Aug. 1, 2008 and partial translation.

* cited by examiner

*Primary Examiner* — Que T Le
*Assistant Examiner* — Pascal M Bui-Pho
(74) *Attorney, Agent, or Firm* — Rossi, Kimms & McDowell LLP

(57) ABSTRACT

An optical system for image projection is disclosed which is capable of improving contrast while suppressing reduction of light amount. The optical system includes a converging optical system, and a polarization beam splitting surface transmitting an incoming light flux having a first polarization direction from the converging optical system, to introduce it to the image-forming element and causing light having a second polarization direction, of an outgoing light flux from the image-forming element, to proceed to a projection optical system. In a first cross-section parallel to a normal to the polarization beam splitting surface, the converging optical system has a configuration causing an incident angle on the splitting surface of a light ray passing through a barycenter of intensity distribution of the outgoing light flux to be larger than an incident angle thereon of a light ray passing through a barycenter of intensity distribution of the incoming light flux.

9 Claims, 22 Drawing Sheets

OPTICAL SYSTEM FOR IMAGE PROJECTION AND IMAGE PROJECTION APPARATUS INCLUDING A POLARIZATION BEAM SPLITTING SURFACE

BACKGROUND OF THE INVENTION

The present invention relates to an optical system for an image projection apparatus using a reflective image-forming element.

Japanese Patent Laid-Open No. 2000-206463 has disclosed an image projection apparatus which uses a reflective image-forming element such as a reflective liquid crystal panel and in which its optical system makes convergent angles of a light flux illuminating the image-forming element different from each other in two cross-sections perpendicular to each other to improve contrast of projected images.

This optical system makes the convergent angle of the light flux small in a direction in which illumination light or projection light is bent by 90 degrees (that is, a certain direction) by a polarization beam splitting film of a polarization beam splitter which is used for introducing the illumination light to the reflective image-forming element and analyzing a polarization state of the projection light. Such an optical system suppresses variations of characteristics of the polarization beam splitting film depending on incident angles and reduces the amount of so-called leakage light from the polarization beam splitting film to improve contrast of projected images.

A too-small convergent angle of the light flux of the illumination light or projection light in the above certain direction reduces the amount of the projection light, resulting in dark projected images. The optical system disclosed in Japanese Patent Laid-Open No. 2000-206463 limits the light flux of the illumination light with an aperture stop having different aperture widths in two directions perpendicular to each other. This optical system, however, needs a narrow aperture width of the aperture stop in order to reduce the convergent angle of the light flux, resulting in a significant reduction of the amount of light.

Japanese Patent Laid-Open No. 2001-83604 has disclosed an optical system which reduces the convergent angle of the light flux with a function of a lens such as a cylindrical lens. Such an optical system has been disclosed also in Japanese Patent Laid-Open No. 2000-137290.

Specifically, an afocal system is provided which is constituted by a lens having a positive optical power (+) and a lens having a negative optical power (−), only in a certain direction of an illumination optical system. This afocal system can compress the light flux to −/+|, and converging the compressed light flux with a lens can reduce the convergent angle of the light flux only in the certain direction.

In the optical system disclosed in the Japanese Patent Laid-Open No. 2000-137290, it can be considered that there is no loss of the amount of light because the light flux is compressed. However, since an actual illumination light flux includes not only parallel light rays but also light rays of various directions, angular components of the illumination light flux increase in reverse proportion to the value of −/+|. The increase of the angle of the light flux causes reduction of efficiency at a lens array that produces plural light fluxes for superposingly illuminating the image-forming element and at a polarization conversion element that converts non-polarized light from a light source into predetermined linearly-polarized light, resulting in reduction of the amount of light in practice.

BRIEF SUMMARY OF THE INVENTION

The present invention provides an optical system capable of improving contrast while suppressing reduction of the amount of light and an image projection apparatus with the same.

According to an aspect, the present invention provides an optical system for image projection which includes a converging optical system which converges a light flux from a light source toward a reflective image-forming element, and a polarization beam splitting surface which transmits an incoming light flux having a first polarization direction, of the light flux from the converging optical system, to introduce it to the reflective image-forming element and causes light having a second polarization direction perpendicular to the first polarization direction, of an outgoing light flux from the reflective image-forming element, to proceed to a projection optical system. In a first cross-section which is parallel to a normal to the polarization beam splitting surface and a normal to an entrance/emergence surface of the reflective image-forming element, the converging optical system has a configuration which causes an incident angle on the polarization beam splitting surface of a light ray passing through a barycenter of intensity distribution of the outgoing light flux to be larger than an incident angle on the polarization beam splitting surface of a light ray passing through a barycenter of intensity distribution of the incoming light flux, the configuration being one of a configuration in which a portion of the converging optical system is decentered with respect to another portion thereof and a configuration inclining with respect to the normal to the entrance/emergence surface.

According to another aspect, the present invention provides an image projection apparatus including the above optical system and an image display system constituted by the image projection apparatus and an image supply apparatus which supplies image information to the image projection apparatus.

Other objects and features of the present invention will become apparent from the following description and the attached drawings.

DETAILED DESCRIPTION OF THE PREFERRED EMBODIMENTS

Preferred embodiments of the present invention will hereinafter be described with reference to the accompanying drawings.

Embodiment 1

Figure 1:
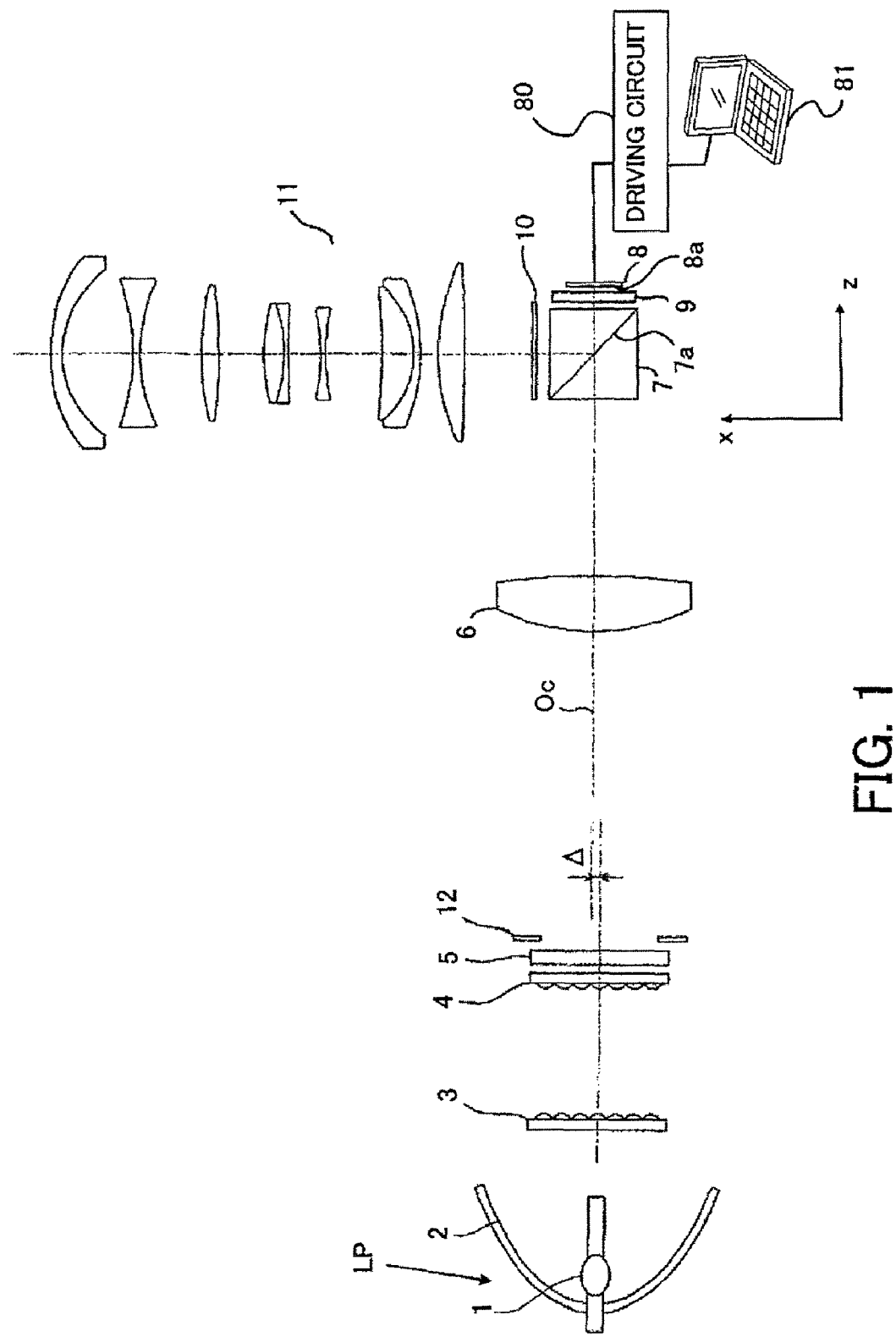
FIG. 1 shows an xz cross-section of an optical system for image projection that is Embodiment 1 of the present invention.
Figure 2:
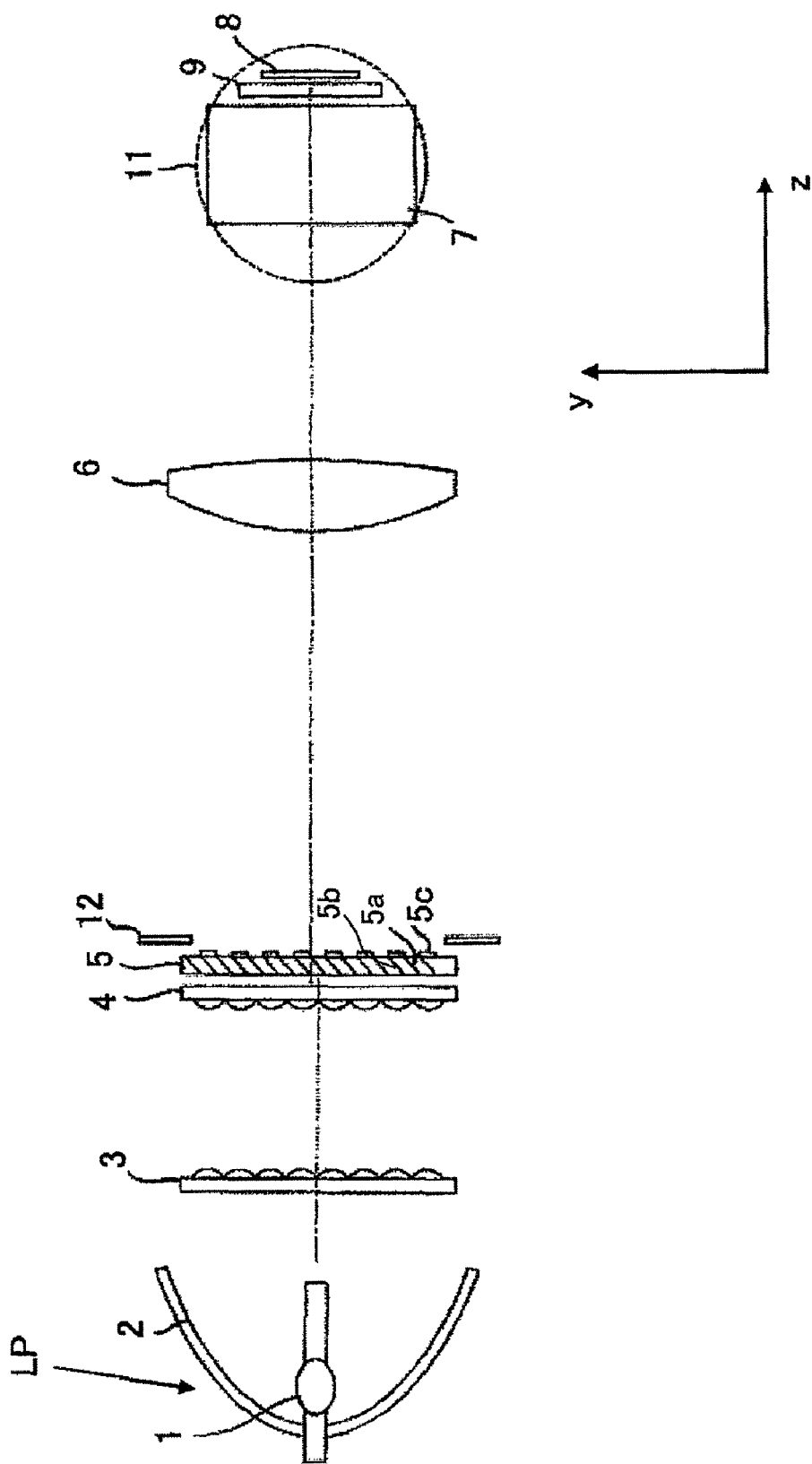
FIG. 2 shows a yz cross-section of the optical system of Embodiment 1.

FIGS. 1 and 2 show the configuration of an optical system for image projection that is Embodiment 1 of the present invention. In this embodiment, Oc represents an optical axis of a condenser lens 6. The optical axis Oc is also an axis (or an optical axis) passing through the center of the condenser lens 6 and the center of an entrance/emergence surface (hereinafter merely referred to as a panel surface) of a reflective liquid crystal panel 8 as a reflective image-forming element.

A direction along the optical axis Oc in which a light flux from a light source lamp LP proceeds toward the reflective liquid crystal panel 8 through the condenser lens 6 and a polarization beam splitter 7 is also referred to as a light proceeding direction (or a z axis direction).

FIG. 1 shows the optical configuration in an xz cross-section (a first cross-section) that is a cross-section parallel to a direction in which the short side of the reflective liquid crystal panel 8 extends, of two cross-sections which are the xz cross-section and a yz cross-section (a second cross-section) each including the optical axis Oc of the condenser lens 6, the xz and yz cross-sections being perpendicular to each other.

The xz cross-section is also a cross-section parallel to a normal to a polarization beam splitting surface 7a of the polarization beam splitter 7 and a normal to the panel surface (entrance/emergence surface) 8a of the reflective liquid crystal panel 8.

FIG. 2 shows the optical configuration in the yz cross-section that is a cross-section parallel to a direction in which the long side of the reflective liquid crystal panel 8 extends. These definitions of the xz and yz cross-sections are also applied to the later-described embodiments.

A white illumination light flux radiated from a light-emitting tube 1 such as a high-pressure mercury discharge tube is converged by a reflector 2 and then enters a first lens array 3. The light-emitting tube 1 and the reflector 2 constitute the light source lamp LP.

The light flux entering the first lens array 3 is divided into plural light fluxes by plural lens cells constituting the first lens array 3. Each of the divided light fluxes is converged toward an entrance surface of a second lens array 4 or the vicinity thereof to form a secondary light source image there.

The plural divided light fluxes emerging from the second lens array 4 enter a polarization conversion element 5.

The polarization conversion element 5 includes, as shown in FIG. 2, plural polarization beam splitting surfaces 5a, plural reflective surfaces 5b and plural half-wave plates 5c.

P-polarized light of non-polarized light entering the polarization conversion element 5 is transmitted through the polarization beam splitting surfaces 5a to emerge from the polarization conversion element 5 without change. On the other hand, S-polarized light is reflected by the polarization beam splitting surfaces 5a and then reflected by the reflective surfaces 5c.

Then, the S-polarized light is rotated by 90 degrees by the half-wave plates 5c to emerge from the polarization conversion element 5 as P-polarized light. The polarization conversion element 5 converts in this way the entering non-polarized light into linearly-polarized light having a polarization direction of P-polarized light.

The plural divided light fluxes emerging from the polarization conversion element 5 are condensed by the condenser lens 6 to be superposed on the reflective liquid crystal panel 8. Thereby, an illumination area having an even intensity distribution is formed on the reflective liquid crystal panel 8.

An optical system (from the first lens array 3 to the condenser lens 6 or the polarization beam splitter 7 in this embodiment) introducing an illumination light flux from the light source lamp LP to the reflective liquid crystal panel 8 in this way is referred to as an illumination optical system that is a converging optical system.

FIGS. 1 and 2 show the configuration in which the illumination light flux (or the illumination light) is transmitted through the polarization beam splitting surface 7a of the polarization beam splitter 7 to reach the reflective liquid crystal panel 8. The polarization beam splitting surface 7a is formed of a multi-layer film.

Such a configuration excels in cutting a polarized light component that is included in the illumination light and different from the polarized light component whose polarization direction is uniformed by the polarization conversion element 5.

A driving circuit 80 is connected to the reflective liquid crystal panel 8, and an image supply apparatus 81 such as a personal computer, DVD player and a television tuner is connected to the driving circuit 80. The driving circuit 80 drives the reflective liquid crystal panel 8 on the basis of image (video) information received from the image supply apparatus 81 to cause the reflective liquid crystal panel 8 to form an original image. The reflective liquid crystal panel 8 image-modulates and reflects the entering light (incoming light flux). Here, a light flux image-modulated by the reflective liquid crystal panel and then emerging therefrom is referred to as an outgoing light flux. This is also applied to the later-described embodiments.

The optical system for image projection of this embodiment is used for a projector that is an image projection apparatus. The projector and the image supply apparatus 81 constitute an image display system. This is also applied to the later-described embodiments.

Projection light image-modulated by the reflective liquid crystal panel 8 enters the polarization beam splitter 7 again and is then reflected by the polarization beam splitting surface 7a thereof. Thereby, the polarization state of the projection light is analyzed.

At this point, a quarter-phase plate 9 provided between the polarization beam splitter 7 and the reflective liquid crystal panel 8 corrects a geometric inclination between the proceeding direction and polarization direction of the projection light.

This suppresses leakage light from the polarization beam splitter 7 (that is, from the polarization beam splitting surface 7a) in a black display state of the reflective liquid crystal panel 8.

The light reflected by the polarization beam splitting surface 7a and then emerging from the polarization beam splitter 7 is further analyzed by a polarizing plate 10. The light transmitted through the polarizing plate 10 is projected by a projection lens (or a projection optical system) 11 onto an unshown projection surface such as a screen.

In the optical system configured as above, an optical path proceeding from the light source lamp LP to the projection lens 11 is bent by the polarization beam splitter 7 (that is, by the polarization beam splitting surface 7a). The direction in which the optical path is bent is an x direction that is a first direction, and a direction perpendicular to the x direction and the normal to the entrance/emergence surface, that is, the panel surface 8a that is a light-receiving surface of the reflective liquid crystal panel 8 is a y direction.

Figure 3:
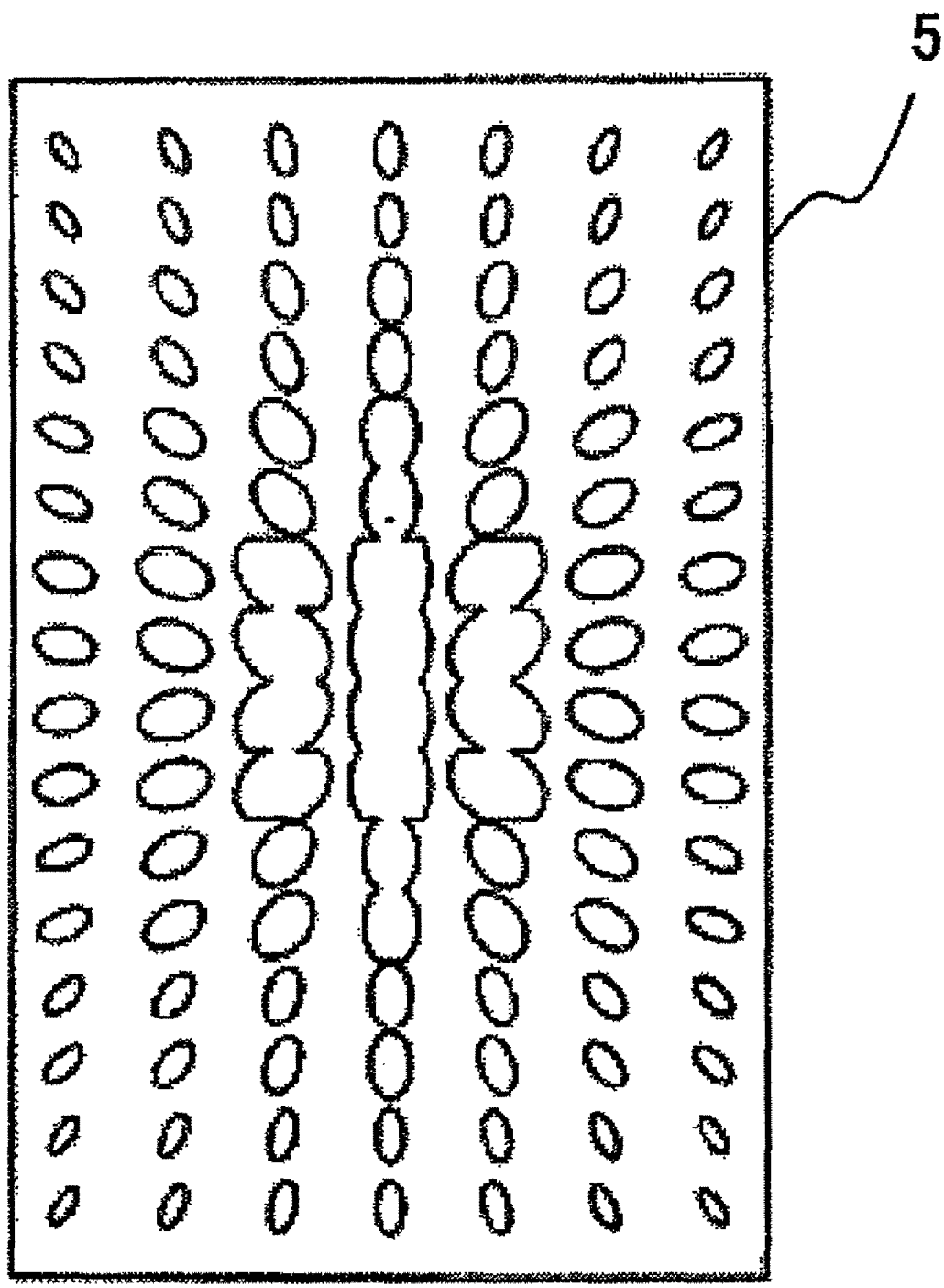
FIG. 3 shows a distribution of light intensity at a polarization conversion element in Embodiment 1.

FIG. 3 shows an intensity distribution of the illumination light on the polarization conversion element 5. The illumination light reflected by the reflector 2 is divided by the first lens array 3 and further divided by the polarization conversion element 5. As a result, on the polarization conversion element 5 an intensity distribution of the illumination light in which plural light source images are distributed in a radial pattern is obtained.

Figure 4:
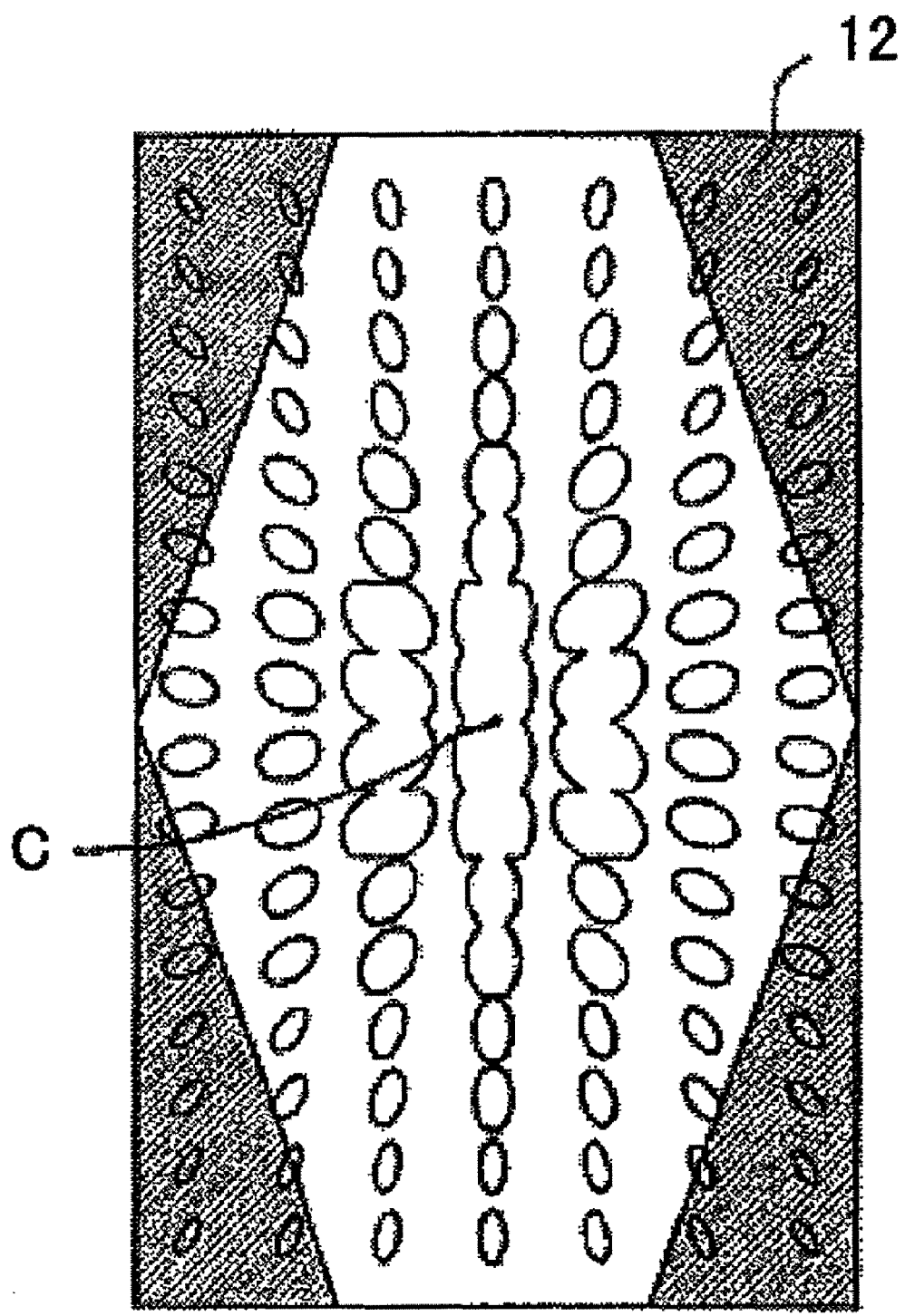
FIG. 4 is a figure for explaining effects of an aperture stop in Embodiment 1.

In this embodiment, as shown in FIGS. 1 and 2, an aperture stop 12 shown in FIG. 4 is provided at a position adjacent to the polarization conversion element 5 to cut part of the illumination light. The reason for this is to limit entrance of an angular light component into the reflective liquid crystal panel 8, the angular light component often becoming leakage light when being analyzed by the polarization beam splitter 7.

In this embodiment, as shown in FIG. 1, an optical system portion from the light source lamp LP (that is, from the reflector 2) to the polarization conversion element 5 and the aperture stop 12 is shifted, that is, decentered by a predetermined amount in the x direction with respect to an optical system portion including the condenser lens 6, the polarization beam splitter 7 (or the polarization beam splitting surface 7a) and subsequent optical elements including the reflective liquid crystal panel 8.

Figure 5:
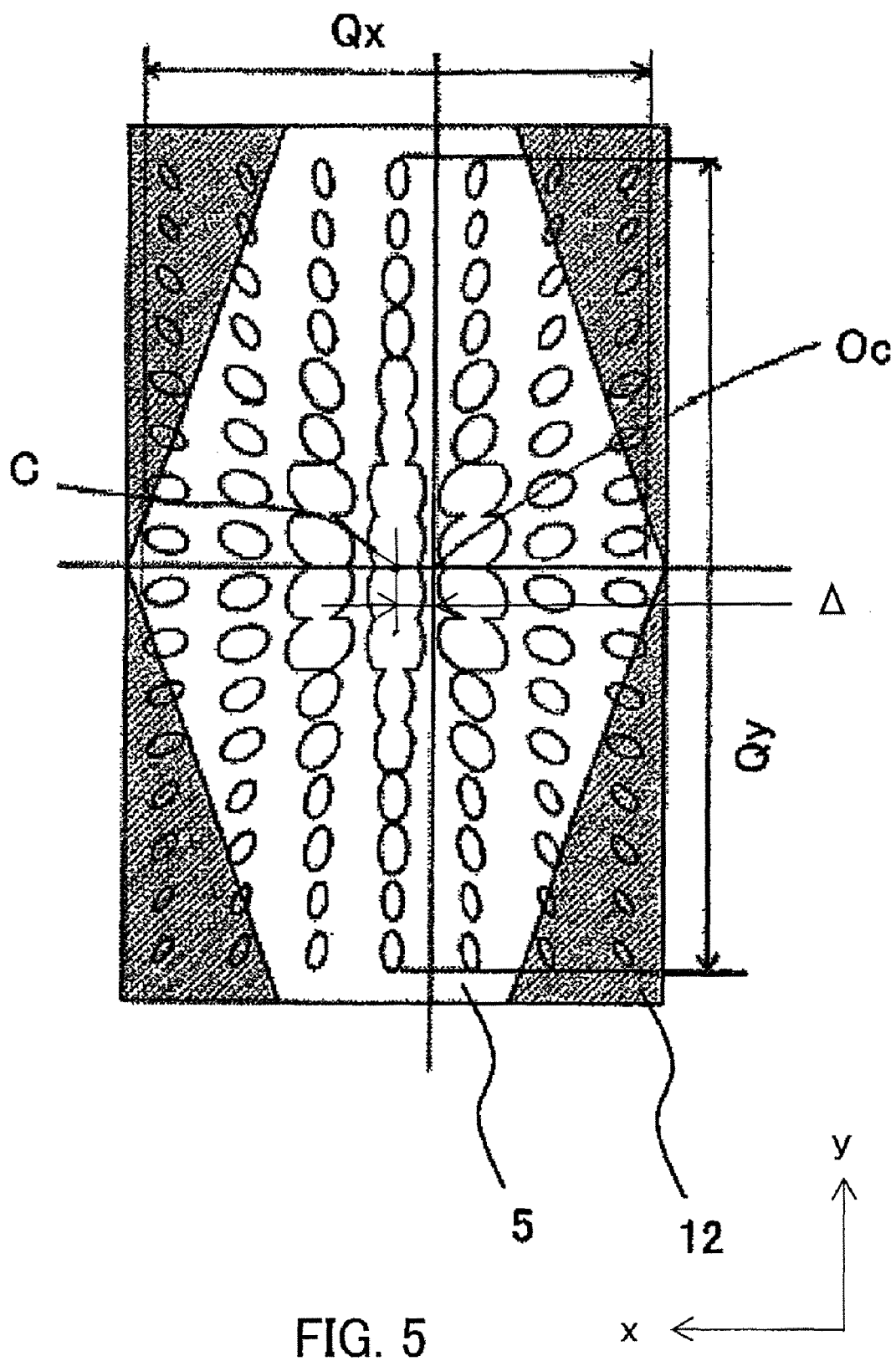
FIG. 5 is a figure for explaining a state of an illumination light flux in Embodiment 1.

This causes, as shown in FIG. 5, the barycenter C of the intensity distribution of the illumination light flux (or the illumination light) to shift by the predetermined amount in the x direction from the optical axis Oc of the condenser lens 6. The decentering causes the aperture stop 12 to have an aperture with a shape being biased in the x direction with respect to the optical axis Oc of the condenser lens 6.

A simple description will be made of how to shift, that is, how to decenter the optical system portion. The description herein is in the xz cross-section (or the first cross-section) parallel to the normal to the polarization beam splitting surface 7a of the polarization beam splitter 7 and the normal to the panel surface 8a of the reflective liquid crystal panel 8.

First, as described above, the converging optical system (that is, the illumination optical system) biases the above-described barycenter C of the intensity distribution of the illumination light flux converging toward a same entrance point on the entrance/emergence surface (or the panel surface) 8a via the polarization beam splitting surface 7a with respect to a normal to the entrance/emergence surface 8a at the above entrance point in a convergent angle direction of the illumination light flux.

The converging optical system has one of the configuration decentered as above and a configuration inclining with respect to the normal to the entrance/emergence surface 8a.

Further, the converging optical system is configured such that an incident angle of a light ray passing through the barycenter C on the polarization beam splitting surface 7a after reflection by the reflective liquid crystal panel 8 is larger than an incident angle of the light ray on the polarization beam splitting surface 7a before entrance into the reflective liquid crystal panel 8.

The ray passing through the barycenter C of the intensity distribution corresponds to a light ray passing through a barycenter at a pupil position of the illumination optical system (or the converging optical system), of the light flux entering the above-described same entrance point.

This configuration can increase the incident angle of the light rays that are reflected by the reflective liquid crystal panel 8 and then impinge on the polarization beam splitting surface 7a, resulting in increase of the amount of light which is used as image light. In other words, this configuration can improve reflectance of the polarization beam splitting surface 7a for S-polarized light.

Next, description will be made of the relationship between the intensity distribution of the illumination light on the polarization conversion element 5 and angular intensity distribution of the light flux converging toward the reflective liquid crystal panel 8.

Figure 6:
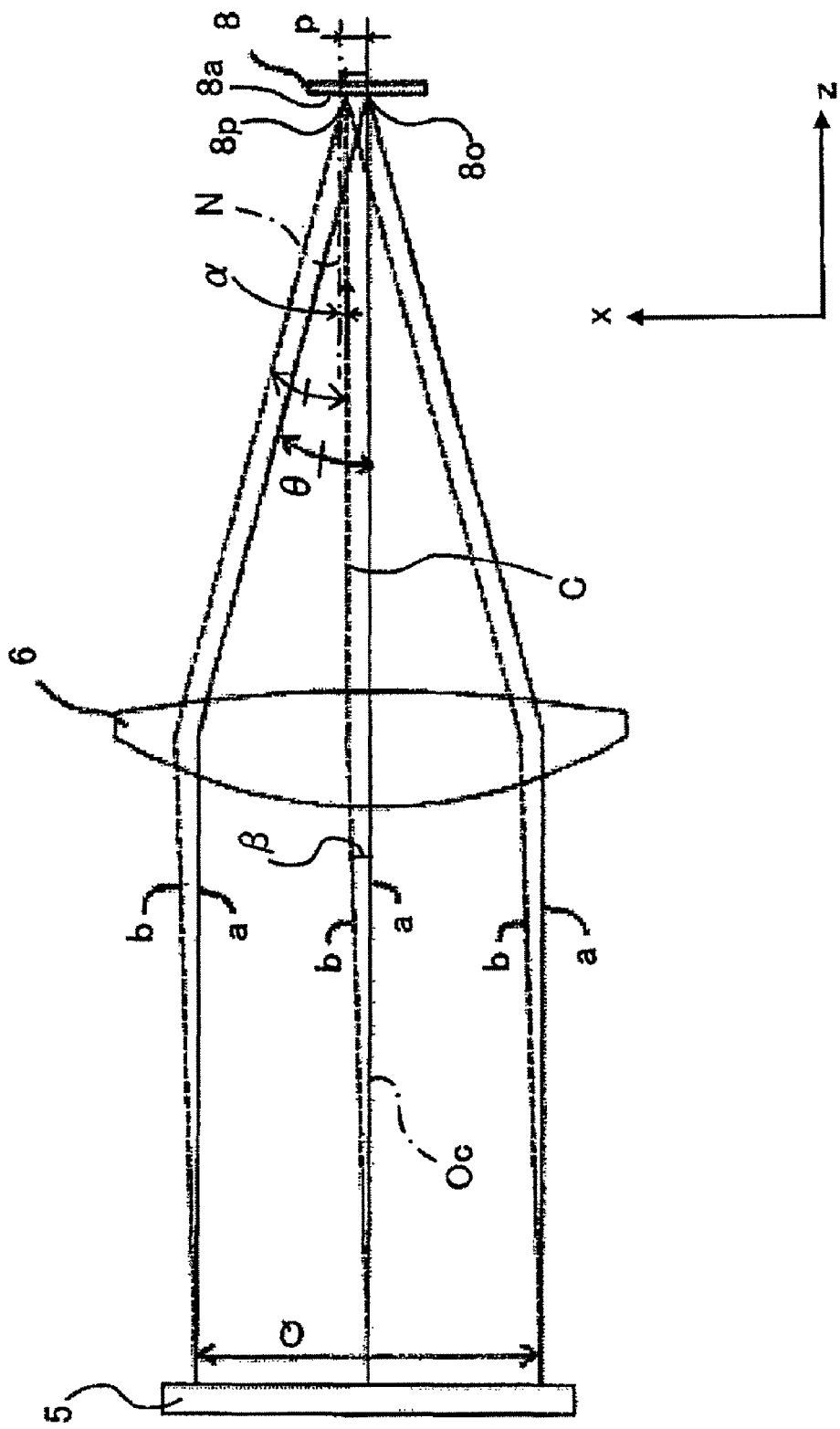
FIG. 6 is a figure for explaining a convergent angle of the illumination light flux in Embodiment 1.

The reflective liquid crystal panel 8 is provided at the vicinity of a focal point position of the condenser lens 6, so that the relationship between the illumination light flux entering the condenser lens 6 and the illumination light flux converging toward the reflective liquid crystal panel 8 is as shown in FIG. 6. FIG. 6 shows the xz cross-section.

In FIG. 6, a light flux a entering the condenser lens 6 in parallel with the optical axis Oc of the condenser lens 6 converges toward the center 8o of the panel surface 8a of the reflective liquid crystal panel 8 so as to form an angle with the optical axis Oc of the condenser lens 6.

When the width of the parallel light flux a is Q and the focal length of the condenser lens 6 is fc, the relationship between the angle and the illumination optical system (Q and fc) is expressed as follows:

$$=\tan^{-1}(Q/2fc).$$

On the other hand, a light flux b entering the condenser lens 6 at an angle of converges at a position 8p on the panel surface 8a of the reflective liquid crystal panel 8 so as to form the same angle as that of the light flux a, the position 8p being shifted from the center 8o of the panel surface 8a.

A distance p from the center 8o to the position 8p in the x direction is expressed as follows:

$$p = fc \times \tan(\ ).$$

According to this, the intensity distribution of the illumination light flux on the polarization conversion element 5 is converted into the angular intensity distribution of the light flux converging toward an arbitrary point (that is, the same entrance point) on the panel surface 8a because the illumination light flux is converged by the condenser lens 6.

The 'angular intensity distribution' herein means an intensity distribution of the light flux converging toward the arbitrary point on the panel surface 8a in the convergent angle direction of that light flux. In addition, a barycenter of the angular intensity distribution, which will be described later, means a position where the intensity is maximum in the angular intensity distribution in the convergent angle direction.

The 'angular intensity distribution' also means an intensity distribution relating to angles, in other words, an intensity distribution in a case where a lateral axis indicates angles and a vertical axis indicates intensities. Specifically, the angular intensity distribution means an intensity distribution relating to incident angles of a light flux entering a certain point. A 'barycenter', which will be described later, means a barycenter or a light ray passing through that barycenter of the intensity distribution relating to incident angles.

In this embodiment, providing the polarization conversion element 5 at the vicinity of an entrance side focal point of the condenser lens 6 makes the illumination light flux telecentric. Therefore, the limitation of the light flux at the vicinity of the polarization conversion element 5 (that is, providing the aperture stop 12) and the decentering of the optical elements (the first and second lens arrays 3, 4 and the polarization conversion element 5) are effective for control of the angular intensity distribution of the light flux converging on the reflective liquid crystal panel 8.

The width Q of the light flux entering the condenser lens 6, shown in FIG. 6, can be regarded as a region where the illumination light flux from the polarization conversion element 5 is transmitted through the condenser lens 6 and emerges therefrom, so that Qx represents the width of the light flux in the x direction and Qy represents the width thereof in the y direction in FIG. 5.

In FIG. 5, Qx and Qy have the following relationship:

$$Qx<Qy.$$

Therefore, when the convergent angle of the illumination light flux in the x direction is x (=1) and the convergent angle of the illumination light flux in the y direction is y (=2), they have the following relationship:

$$x<y.$$

Furthermore, the convergent angle of the illumination light flux in the x direction is biased in the x direction. As a result, a barycenter of the angular intensity distribution (hereinafter referred to as an angular intensity barycenter) of the light flux converging toward the arbitrary point on the panel surface 8a is also biased in the x direction.

In other words, a direction (hereinafter referred to as a barycenter direction) from the angular intensity barycenter of the light flux toward the arbitrary point is inclined with respect to the normal to the panel surface 8a at the arbitrary point.

When an angle of the barycenter direction to a direction of the normal to the panel surface 8a (hereinafter, the angle is referred to as an inclination angle of the barycenter direction) is, it is preferable that be set within the following range:

$$1° 3°  \quad (1).$$

If is smaller than the lower limit of the conditional expression (1), it may be difficult to obtain the effect of biasing the angular intensity barycenter of the converging light flux. On the other hand, if is larger than the upper limit of the conditional expression (1), the light-analyzing performance of the polarization beam splitter 7 may be reduced, and thereby it may be difficult to obtain a desired high contrast.

Moreover, a described above, when the following conditional expression is satisfied:

$$x<y \quad (2).$$

the amount of the leakage light from the polarization beam splitter 7 can be minimized. More preferably, the ratio of x/y satisfies the following conditional expression:

$$0.6<x/y<0.9 \quad (3).$$

If the ratio is smaller than the lower limit of the conditional expression (3), the loss of the amount of light may increase, resulting in a dark projected image. On the other hand, if the ratio is larger than the upper limit of the conditional expression (3), the direction of biasing the angular intensity barycenter corresponds to a direction of increasing the amount of the leakage light in analyzing light, so that the contrast may not be improved, and therefore it may be difficult to obtain the effect of biasing the angular intensity barycenter.

Note that these conditions (1) to (3) are preferably satisfied, but not necessarily required to be satisfied. These conditions (1) to (3) are also preferably satisfied in the later-described embodiments.

Figure 7:
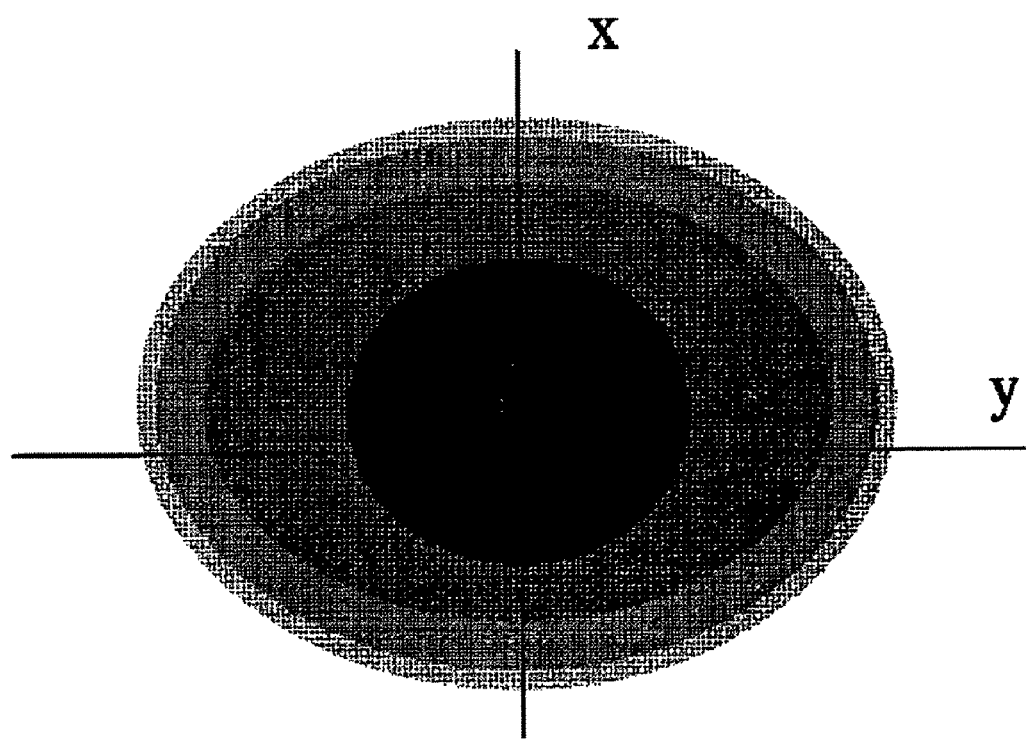
FIG. 7 is a figure for explaining performance for analyzing projection light in Embodiments 1 to 5.

FIG. 7 shows the light-analyzing performance (or the light-analyzing characteristic) of the polarization beam splitter 7 and the polarizing plate 10 for light (or projection light). An x axis and a y axis in FIG. 7 correspond to the x direction and the y direction in FIGS. 1 and 2, respectively.

Characteristics (that is, angular characteristics such as a reflectance characteristic and a transmittance characteristic) of the multi-layer film constituting the polarization beam splitting surface 7a of the polarization beam splitter 7 change depending on incident angles of light thereon. FIG. 7 shows a two-dimensional angular characteristic of the polarization beam splitting surface 7a in a case where the incident angle on the reflective liquid crystal panel 8 is 0 degree. The intersection point of the x and y axes shows 0 degree. FIG. 7 shows that the leakage light reduces as the incident angle is closer to 0 degree, and that the leakage light increases toward the periphery.

According to study by the inventors, the angular characteristic is not symmetric with respect to the center (that is, 0 degree), and the angular characteristic in the x direction is worse than that in the y direction. In other words, the angular characteristic is asymmetric in the x direction.

In this case, in this embodiment, as described above, the aperture stop 12 is provided at the vicinity of the polarization conversion element 5. Further, the optical system portion from the reflector 2 to the polarization conversion element 5 is decentered by the predetermined amount with respect to the optical system portion including the condenser lens 6 and the subsequent optical elements to shift the angular intensity barycenter from the optical axis Oc of the condenser lens 6 in the x direction.

Thereby, the barycenter direction is inclined with respect to the normal direction of the panel surface 8a, which enables to adjust the intensity distribution of the light flux from the illumination optical system to the light-analyzing characteristic shown in FIG. 7. The normals to the panel surface at arbitrary points are parallel to the optical axis Oc of the condenser lens 6.

Thus, the loss of the amount of light can be reduced as compared to the conventional configuration that attempts to improve the contrast only by using an aperture stop.

The above-described angular intensity distribution can be derived from the intensity distribution of the illumination light on the polarization conversion element 5. However, the intensity distribution of the illumination light on the polarization conversion element 5 is an aerial intensity distribution of the light flux transmitted through the polarization conversion element 5, so that it may be difficult to determine the distribution.

Figure 8:
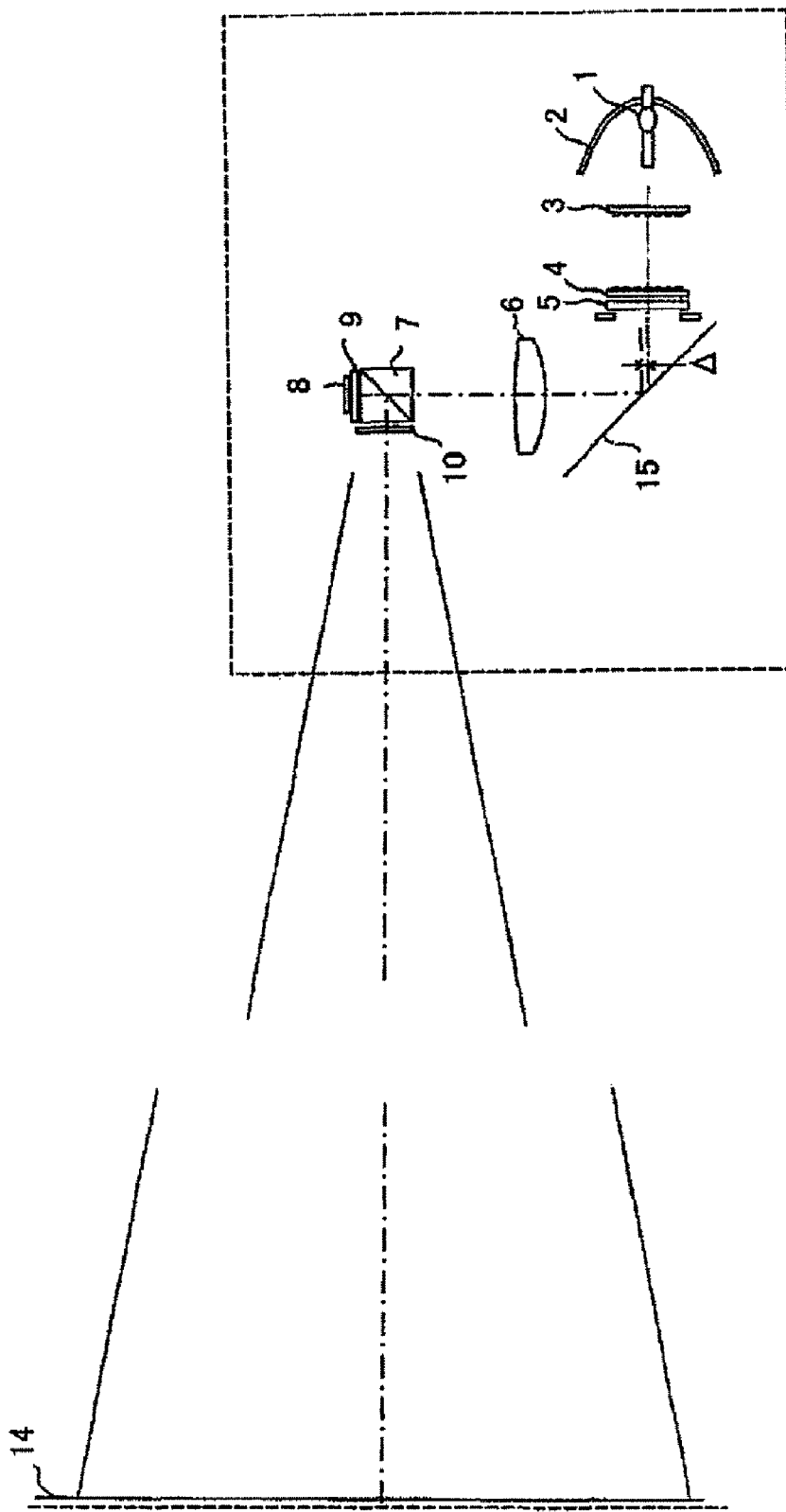
FIG. 8 is a figure for explaining a method to determine the distribution of light intensity in Embodiment 1.

In such a case, as shown in FIG. 8, removing the projection lens 11 to directly introduce the light from the polarizing plate 10 to a screen 14 enables to obtain an intensity distribution similar to that on the polarization conversion element 5. The center of the distribution in this case is the center of the reflective liquid crystal panel 8. In FIG. 8, reference numeral 15 shows a mirror to bend the optical path.

Embodiment 2

Figure 9:
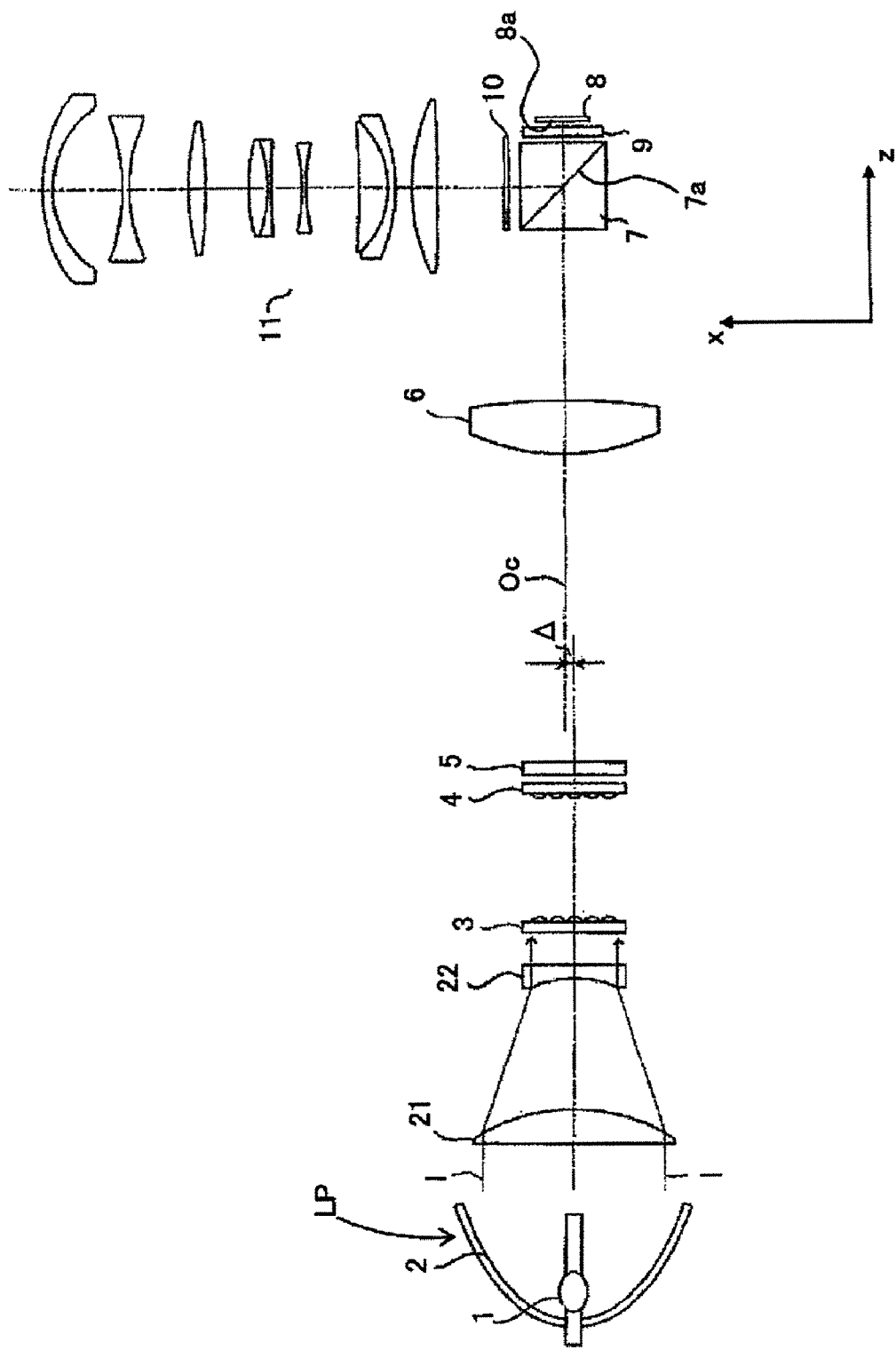
FIG. 9 shows an xz cross-section of an optical system for image projection that is Embodiment 2 of the present invention.
Figure 10:
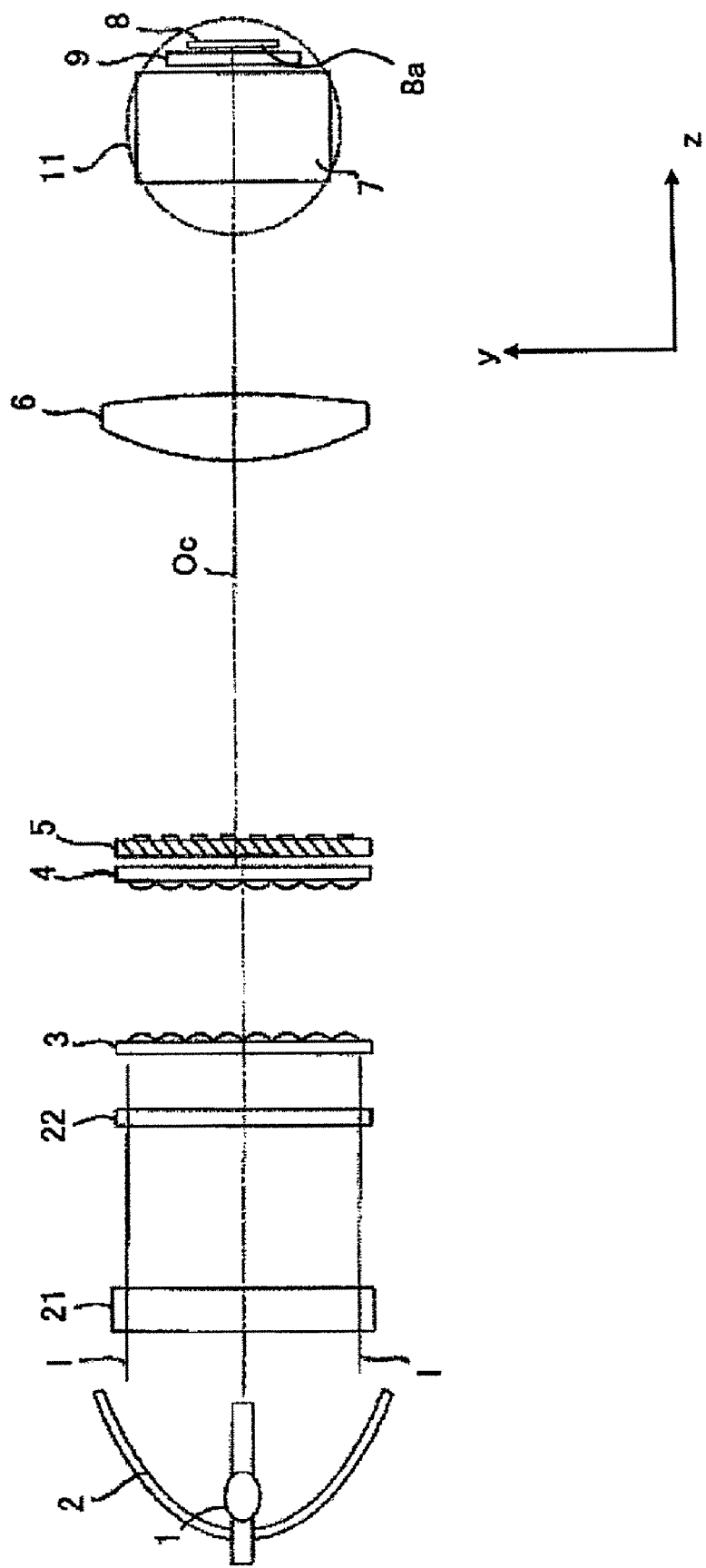
FIG. 10 shows a yz cross-section of the optical system of Embodiment 2.

FIGS. 9 and 10 show the configuration of an optical system for image projection that is Embodiment 2 of the present invention. This embodiment corresponds to an optical system in which an anamorphic light flux compression system is provided to the illumination optical system of Embodiment 1.

In this embodiment, the elements identical to those described in Embodiment 1 are designated with the same reference numerals.

In this embodiment, a convex cylindrical lens 21 and a concave cylindrical lens 22 are provided in order from the lamp side between a light source lamp LP and a first lens array 3. The convex cylindrical lens 21 is a toric lens having a positive refractive power (that is, a positive optical power) in an x direction and no refractive power in a y direction. The concave cylindrical lens 22 is a toric lens having a negative refractive power in the x direction and no refractive power in the y direction.

FIG. 9 shows an xz cross-section where a light flux is compressed by the convex cylindrical lens 21 and the concave cylindrical lens 22. FIG. 10 shows a yz cross-section where a light flux is not refracted by the convex cylindrical lens 21 and the concave cylindrical lens 22.

A white illumination light flux radiated from a light-emitting tube 1 of a light source lamp LP is collimated by a reflector 2 to become a parallel light flux and then enters the convex cylindrical lens 21. The parallel light flux entering the convex cylindrical lens 21 is converged in the cross-section shown in FIG. 9 and then enters the concave cylindrical lens 22. The converging light flux entering the concave cylindrical lens 22 is converted, by the refractive power of the concave cylindrical lens 22 set so as to create a substantially afocal state together with the convex cylindrical lens 21, into a parallel light flux again, that is, compressed and then enters the first lens array 3.

The light flux entering the first lens array 3 is divided into plural light fluxes by plural lens cells constituting the first lens array 3. The plural light fluxes are transmitted through a second lens array 4 and then enter a polarization conversion element 5.

Non-polarized light entering the polarization conversion element 5 is converted into linearly-polarized light having a polarization direction as described in Embodiment 1.

The plural light fluxes emerging from the polarization conversion element 5 are condensed by a condenser lens 6 to be superposed on a reflective liquid crystal panel 8.

Also in this embodiment, the illumination light flux is transmitted through a polarization beam splitting surface 7a of a polarization beam splitter 7 to reach the reflective liquid crystal panel 8 as in Embodiment 1.

Light image-modulated by the reflective liquid crystal panel 8 is reflected by the polarization beam splitting surface 7a, by which its polarization state is analyzed. The function of a quarter-phase plate 9 is the same as that in Embodiment 1.

The light reflected by the polarization beam splitting surface 7a and then emerging from the polarization beam splitter 7 is further analyzed by a polarizing plate 10. The light transmitted through the polarizing plate 10 is projected by a projection lens 11 onto an unshown screen.

Figure 11:
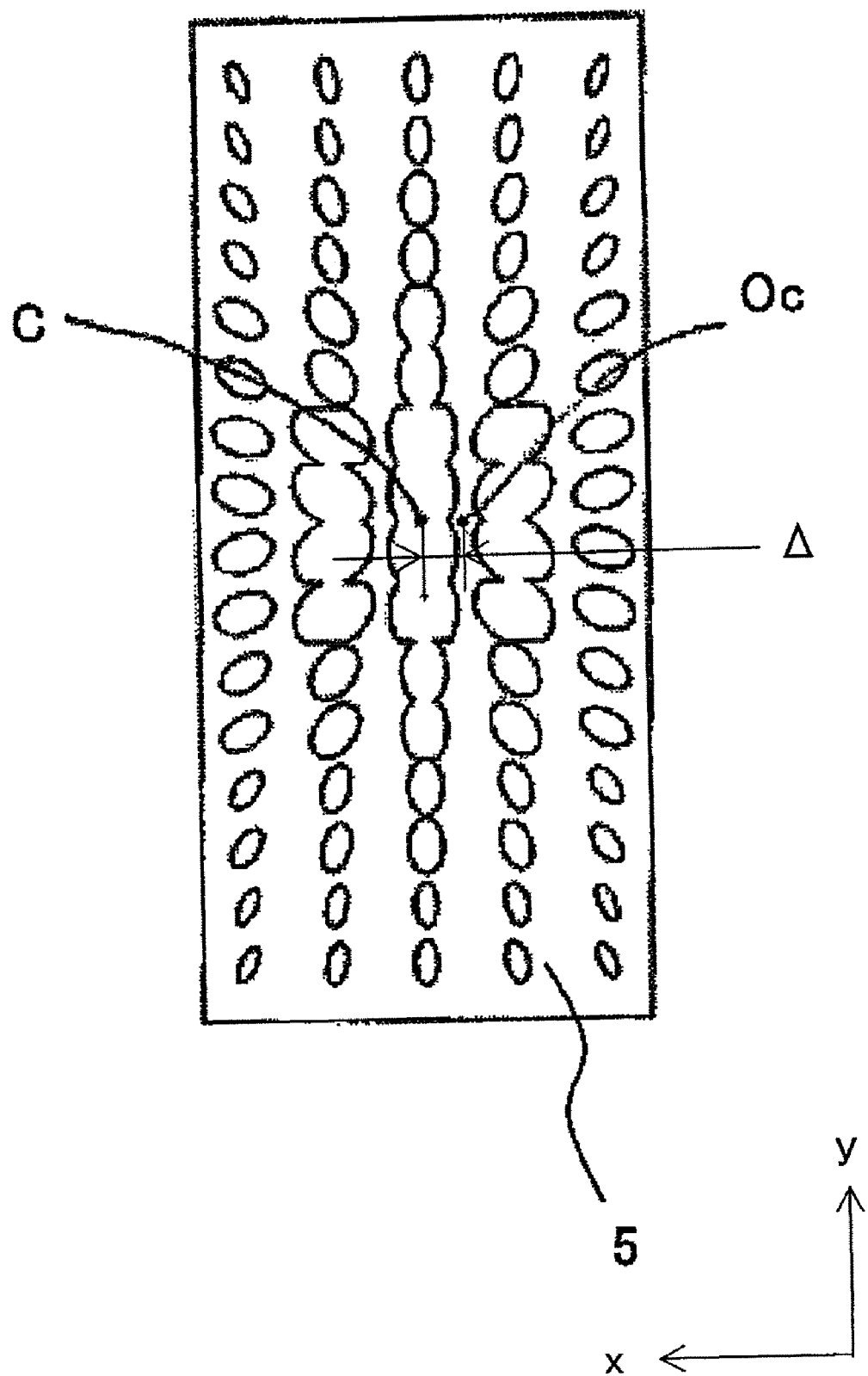
FIG. 11 shows a distribution of light intensity at a polarization conversion element in Embodiment 2.

FIG. 11 shows an intensity distribution of the illumination light on the polarization conversion element 5. The illumination light (shown by l in the figure) reflected by the reflector 2 is compressed by convex and concave cylindrical lenses 21 and 22, then divided by the first lens array 3 and further divided by the polarization conversion element 5. As a result, on the polarization conversion element 5 an intensity distribution of the illumination light in which plural flattened light source images are distributed is obtained.

In this embodiment, an optical system portion from the light source lamp LP (that is, from the reflector 2) to the polarization conversion element 5 is shifted, that is, decentered by a predetermined system portion including the condenser lens 6, the polarization beam splitter 7 (or the polarization beam splitting surface 7a) and subsequent optical elements including the reflective liquid crystal panel 8.

This can cause a barycenter C of the intensity distribution of the illumination light flux on the polarization conversion element 5 to shift by optical axis Oc of the condenser lens 6.

Thereby, the light flux converges toward an arbitrary point on the panel surface 8a in a state in which its intensity distribution on the polarization conversion element 5 is converted into an angular intensity distribution. This can bias an angular intensity barycenter of the light flux converging toward the arbitrary point on the panel surface 8a in the x direction with respect to the normal to the panel surface 8a at the arbitrary point. In other words, this can incline a barycenter direction in the x direction with respect to a normal to the panel surface 8a.

As described above, in this embodiment, the angular intensity distribution of the illumination light flux is flattened by the convex cylindrical lens 21 and the concave cylindrical lens 22. Further, the optical system portion from the reflector 2 to the polarization conversion element 5 is shifted by the to the optical system portion including the condenser lens 6 and the subsequent optical elements to shift the angular intensity barycenter from the optical axis Oc of the condenser lens 6.

This enables to adjust the intensity distribution of the light flux from the illumination optical system (or the converging light flux) to the light-analyzing characteristic shown in FIG. 7. Thus, the loss of the amount of light can be reduced as compared to the conventional configuration that attempts to improve the contrast only by using convex and concave cylindrical lenses. Moreover, in this embodiment, the compression of the light flux in the x direction can bias the angular intensity barycenter such that the loss of the amount of light is further reduced.

A simple description will be made of how to shift, that is, how to decenter the optical system portion. The description herein is in the xz cross-section (or the first cross-section) parallel to a normal to the polarization beam splitting surface 7a of the polarization beam splitter 7 and the normal to the panel surface (or the entrance/emergence surface) 8a of the reflective liquid crystal panel 8. The xz cross-section is parallel to a direction of the compression of the light flux in this embodiment.

First, as described above, the converging optical system biases the barycenter C of the intensity distribution of the illumination light flux converging toward a same entrance point on the entrance/emergence surface (or the panel surface) 8a via the polarization beam splitting surface 7a with respect to the normal to the entrance/emergence surface 8a at the above entrance point in a convergent angle direction of the illumination light flux.

The converging optical system has one of the configuration decentered as above and a configuration inclining with respect to the normal to the entrance/emergence surface 8a.

Further, the converging optical system is configured such that an incident angle of a light ray passing through the above-described barycenter C on the polarization beam splitting surface 7a after reflection by the reflective liquid crystal panel 8 is larger than an incident angle of the light ray on the polarization beam splitting surface 7a before entrance into the reflective liquid crystal panel 8.

The ray passing through the barycenter C of the intensity distribution corresponds to a light ray passing through a barycenter at a pupil position of the illumination optical system (or the converging optical system), of the light flux entering the above-described same entrance point.

This configuration can increase the incident angle of the light rays that are reflected by the reflective liquid crystal panel 8 and then impinge on the polarization beam splitting surface 7a, resulting in increase of the amount of light which is used as image light. In other words, this configuration can improve reflectance of the polarization beam splitting surface 7a for S-polarized light.

Figure 12:
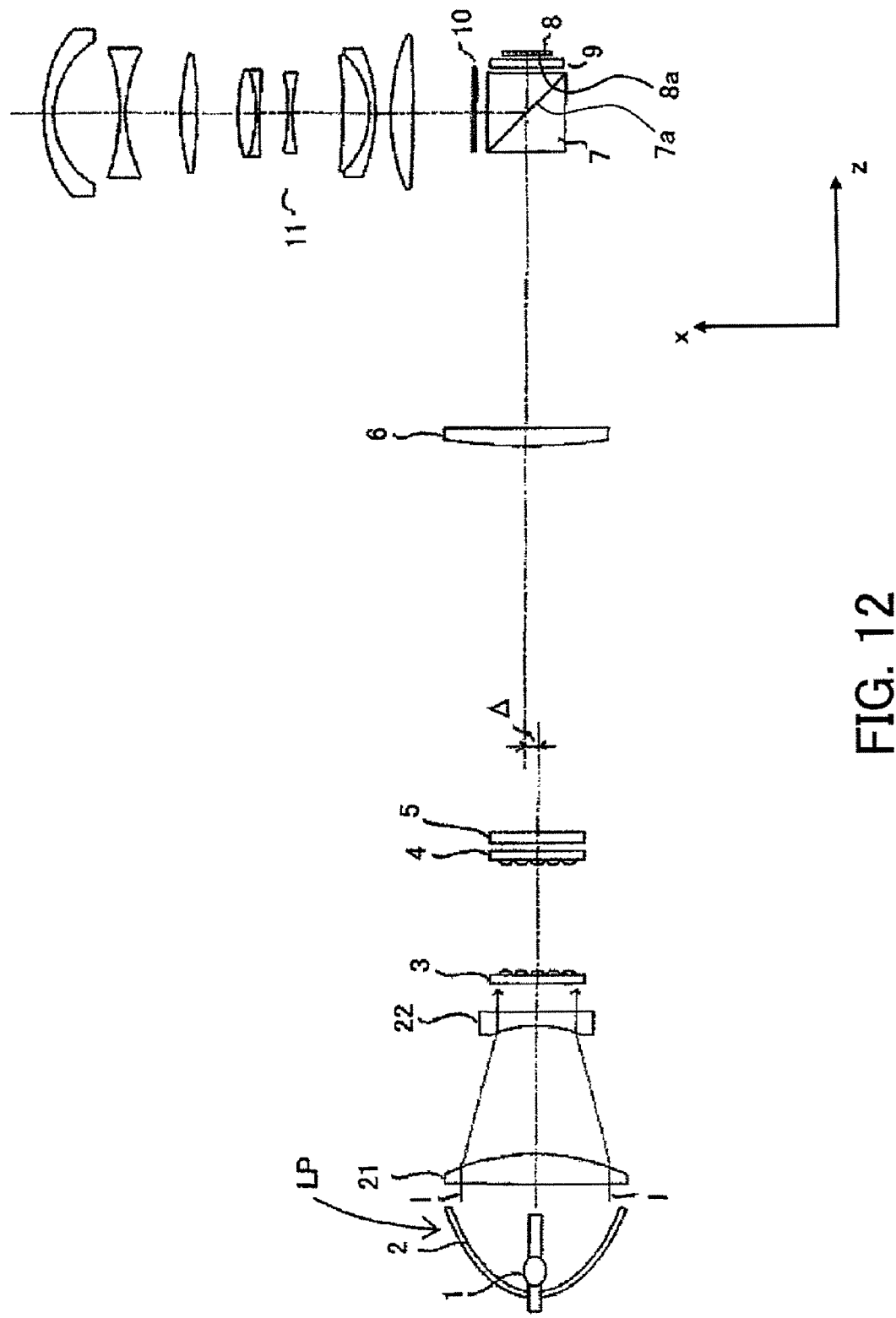
FIG. 12 shows an xz cross-section of an optical system for image projection that is a modified example of Embodiment 2.
Figure 13:
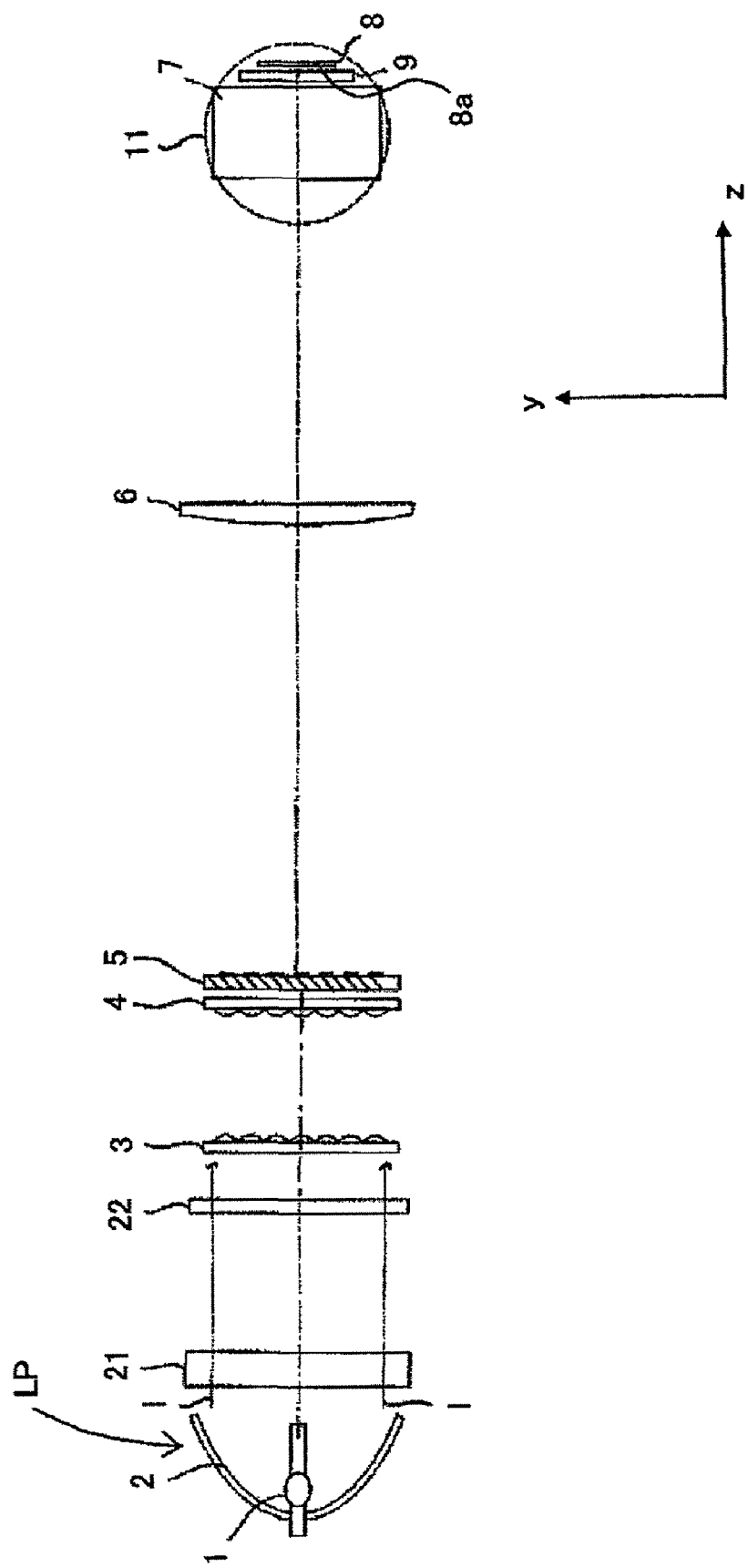
FIG. 13 shows a yz cross-section of the optical system shown in FIG. 12.

A description will hereinafter be made of specific study by the inventors. The inventors studied a configuration using a relatively small reflective liquid crystal panel to prioritize brightness as shown in FIGS. 9 and 10 and a configuration using a relatively large reflective liquid crystal panel to prioritize contrast as shown in FIGS. 12 and 13. The elements shown in FIGS. 12 and 13 are the same as those shown in FIGS. 9 and 10.

The above two configurations are different in the focal length of the condenser lens 6 and the size of each of lens cells constituting the first and second lens arrays 3 and 4. The different focal lengths of the condenser lenses 6 in the two configurations change the convergent angle of the light flux converging on the reflective liquid crystal panel 8, thereby controlling the state in which the brightness is prioritized and the state in which the contrast is prioritized.

Further, the different focal lengths of the condenser lenses 6 and the different sizes of each of the lens cells in the first and second lens arrays 3 and 4 control the size of an even illumination area corresponding to the size of the reflective liquid crystal panel 8.

In the configuration shown in FIGS. 9 and 10, and Q were as follows:

fc=67 mm

Q=21 mm,

On the other hand, in the configuration shown in FIGS. 12 and 13, a good contrast was achieved when fc=134 mm Q=28.4 mm, As described above, the configuration in this embodiment is widely different from that in Embodiment 1. However, the contrast is much affected by the light-analyzing performance shown in FIG. 7, so that it barycenter direction satisfy the conditional expression (1) described in Embodiment 1.

Embodiment 3

Figure 14:
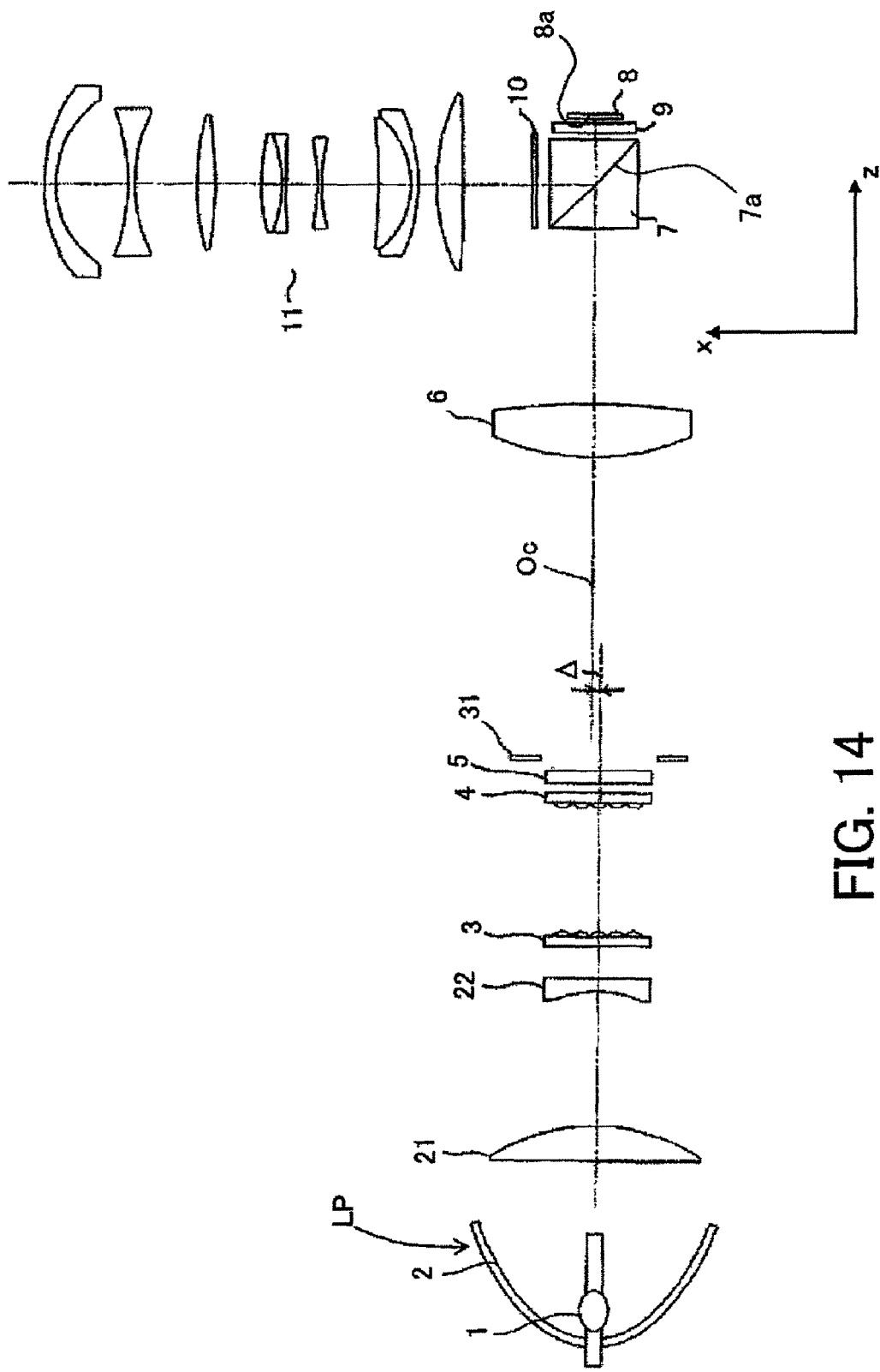
FIG. 14 shows an xz cross-section of an optical system for image projection that is Embodiment 3 of the present invention.
Figure 15:
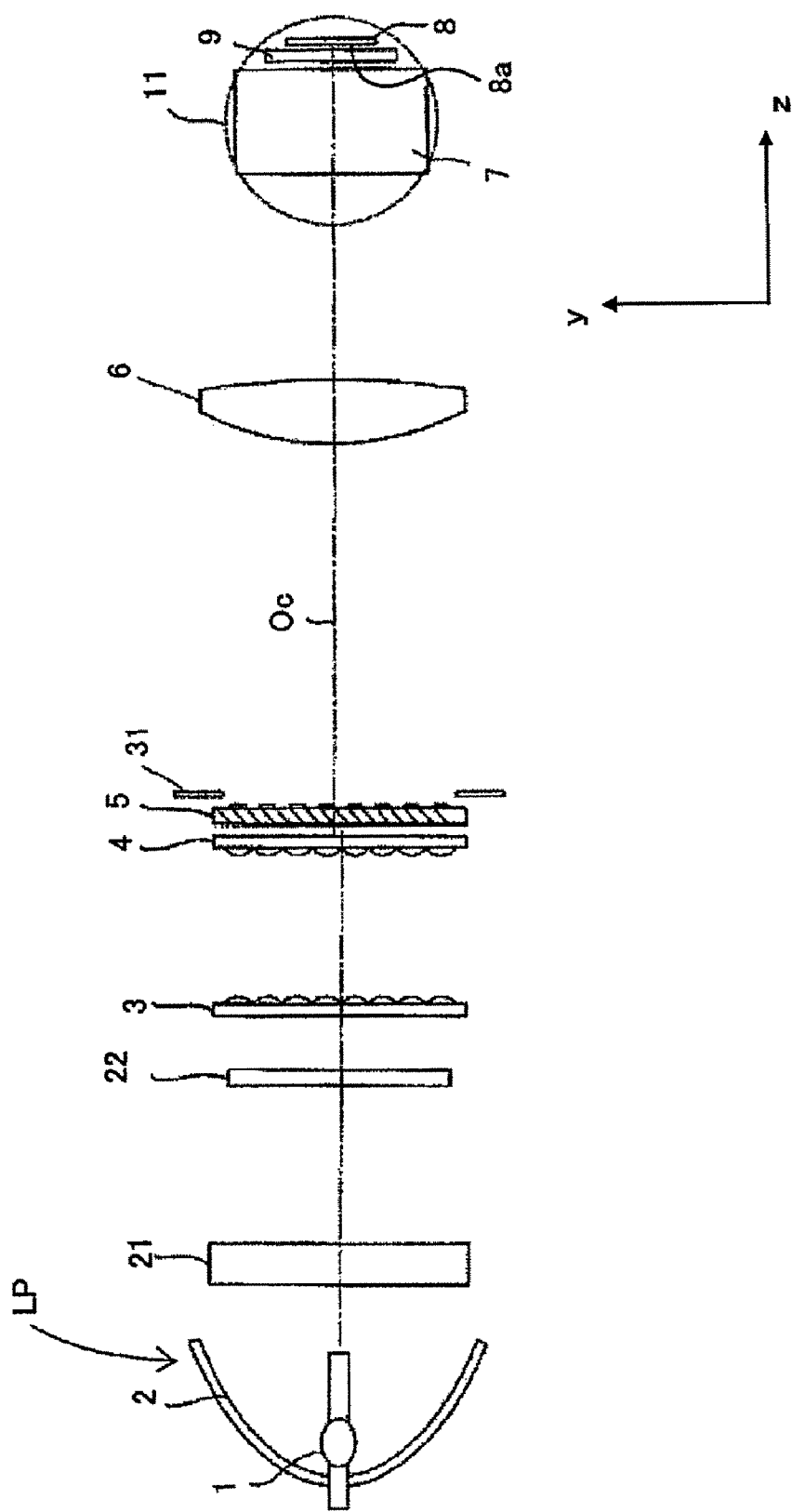
FIG. 15 shows a yz cross-section of the optical system of Embodiment 3.

FIGS. 14 and 15 show the configuration of an optical system for image projection that is Embodiment 3 of the present invention. This embodiment is a modified example, and the elements identical to those described in Embodiment 2 are designated with the same reference numerals.

This embodiment corresponds to an optical system in which an aperture stop is provided to the illumination optical system of Embodiment 2. The aperture stop is provided at a position adjacent to the polarization conversion element 5.

FIG. 14 shows the xz cross-section where a light flux is compressed by the convex cylindrical lens 21 and the concave cylindrical lens 22. FIG. 15 shows the yz cross-section where a light flux is not refracted by the convex cylindrical lens 21 and the concave cylindrical lens 22.

A white illumination light flux radiated from the light-emitting tube 1 is collimated by the reflector 2 to become a parallel light flux and then enters the convex cylindrical lens 21. The parallel light flux entering the convex cylindrical lens 21 is converged in the cross-section shown in FIG. 14 and then enters the concave cylindrical lens 22. The converging light flux entering the concave cylindrical lens 22 is converted, by the refractive power of the concave cylindrical lens 22 set so as to create a substantially afocal state together with the convex cylindrical lens 21, into a parallel light flux again, that is, compressed and then enters the first lens array 3.

The light flux entering the first lens array 3 is divided into plural light fluxes by the plural lens cells constituting the first lens array 3. The plural light fluxes are transmitted through the second lens array 4 and then enter the polarization conversion element 5.

Non-polarized light entering the polarization conversion element 5 is converted into linearly-polarized light having a polarization direction as described in Embodiments 1 and 2.

The plural light fluxes emerging from the polarization conversion element 5 are condensed by the condenser lens 6 to be superposed on the reflective liquid crystal panel 8.

Also in this embodiment, the illumination light flux is transmitted through the polarization beam splitting surface 7a of the polarization beam splitter 7 to reach the reflective liquid crystal panel 8 as in Embodiments 1 and 2.

Light image-modulated by the reflective liquid crystal panel 8 is reflected by the polarization beam splitting surface 7a, by which its polarization state is analyzed. The function of the quarter-phase plate 9 is the same as that in Embodiment 1.

The light reflected by the polarization beam splitting surface 7a and then emerging from the polarization beam splitter 7 is further analyzed by the polarizing plate 10. The light transmitted through the polarizing plate 10 is projected by the projection lens 11 onto an unshown screen.

The intensity distribution of the illumination light on the polarization conversion element 5 is the same as that described in Embodiment 2 using FIG. 11. In other words, the intensity distribution in which the plural flattened light source images are distributed is obtained.

In this embodiment, an aperture stop 31 is provided at a position adjacent to the polarization conversion element 5 to cut part of the illumination light flux.

Further, in this embodiment as shown in FIG. 14, an optical system portion from the light source lamp LP (that is, from the reflector 2) to the polarization conversion element 5 is shifted, that is, decentered by a predetermined amount direction with respect to an optical system portion including the condenser lens 6 and the subsequent optical elements.

Figure 16:
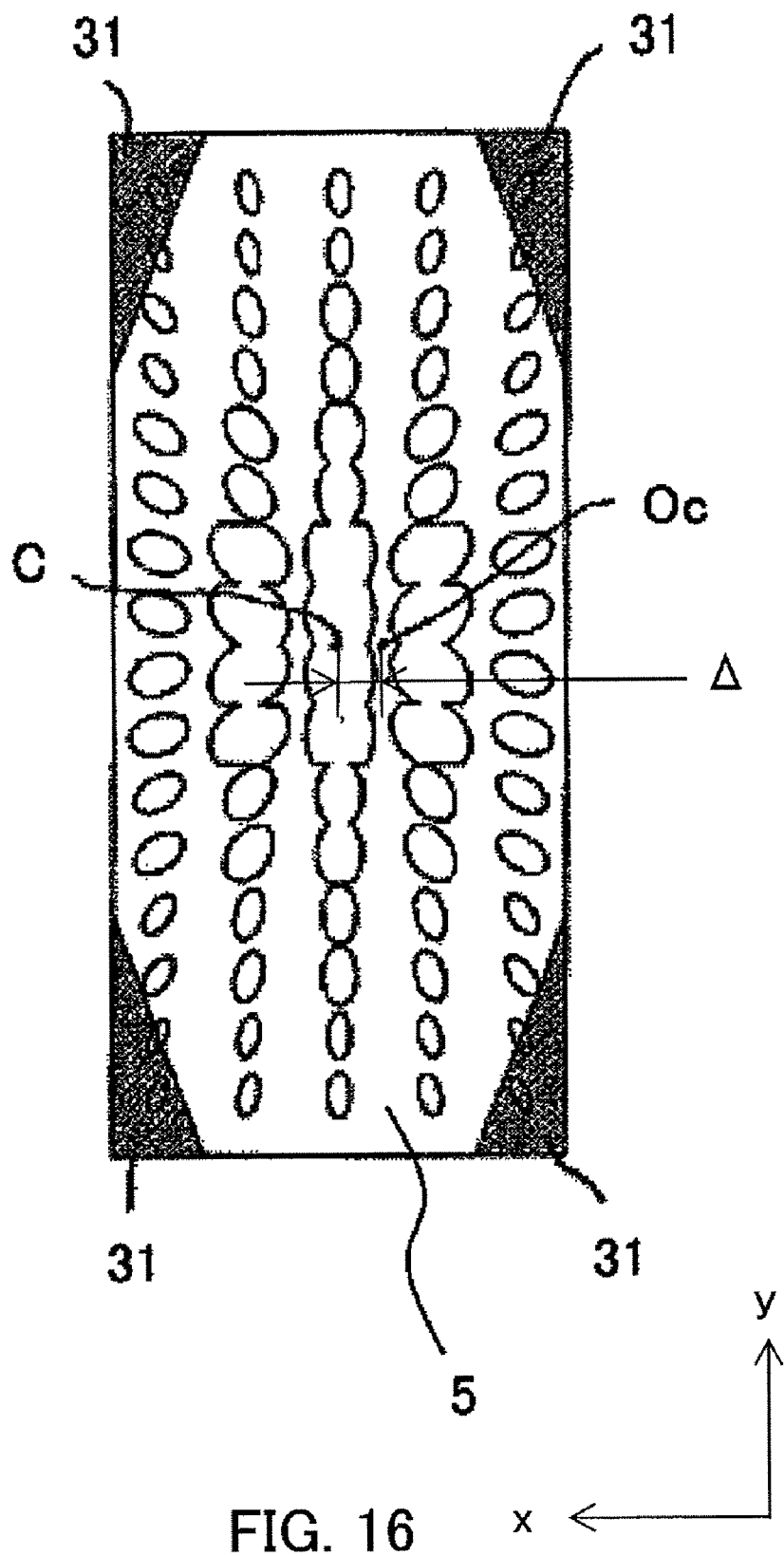
FIG. 16 shows a distribution of light intensity at a polarization conversion element in Embodiment 3.

This can cause a barycenter C of the intensity distribution of the illumination light flux on the polarization conversion element 5 to shift by optical axis Oc of the condenser lens 6 as shown in FIG. 16.

The light flux converges toward an arbitrary point on the panel surface 8*a* in a state in which its intensity distribution on the polarization conversion element 5 is converted into an angular intensity distribution. Therefore, a barycenter direction is inclined in the x direction with respect to the normal to the panel surface 8*a*.

As described above, in this embodiment, the angular intensity distribution of the illumination light flux is flattened by the convex cylindrical lens 21 and the concave cylindrical lens 22. Further, the aperture stop 31 is provided at the vicinity of the polarization conversion element 5, and the optical system portion from the reflector 2 to the polarization conversion element 5 is shifted by the predetermined system portion including the condenser lens 6 and the subsequent optical elements.

This can bias the angular intensity barycenter of the light flux converging toward the arbitrary point on the panel surface 8*a* in the x direction with respect to the normal to the panel surface 8*a* at the arbitrary point. In other words, this can incline the barycenter direction with respect to the normal to the panel surface 8*a*, thereby enabling to adjust the intensity distribution of the light flux from the illumination optical system to the light-analyzing characteristic in FIG. 7.

Embodiment 4

Figure 17:
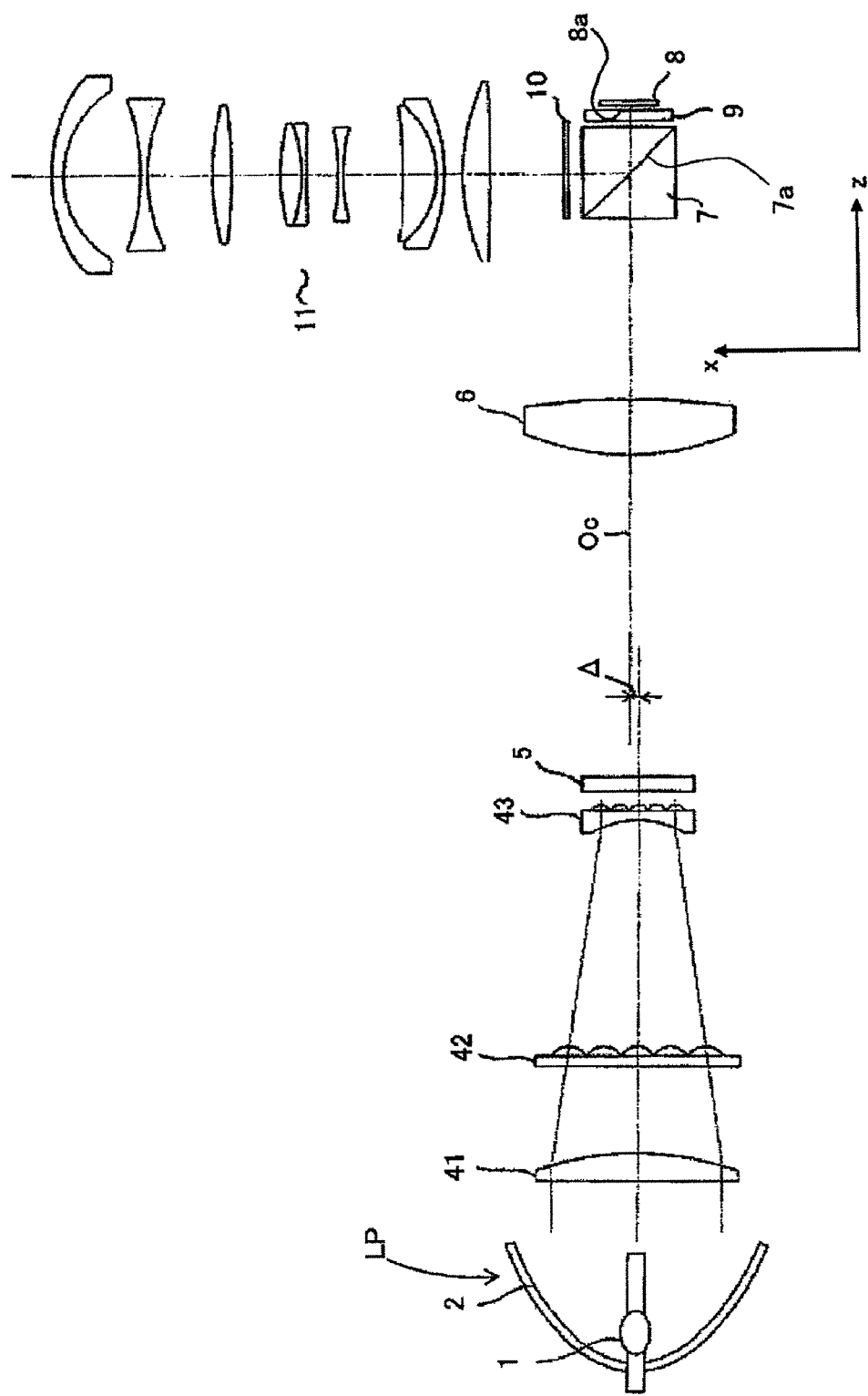
FIG. 17 shows an xz cross-section of an optical system for image projection that is Embodiment 4 of the present invention.
Figure 18:
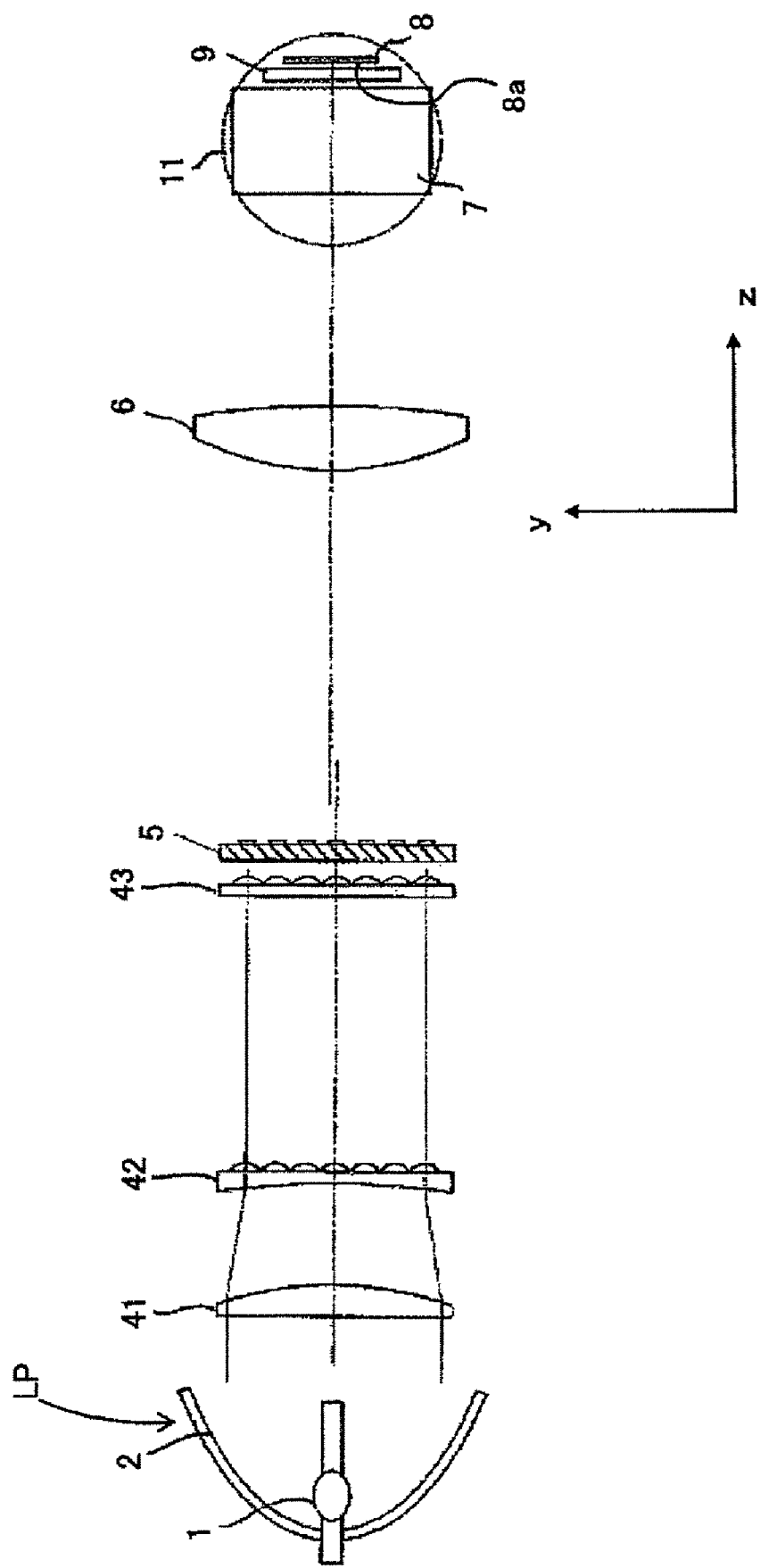
FIG. 18 shows a yz cross-section of the optical system of Embodiment 4.

FIGS. 17 and 18 show the configuration of an optical system for image projection that is Embodiment 4 of the present invention. In this embodiment, the elements identical to those described in Embodiment 2 are designated with the same reference numerals.

In this embodiment, a convex lens 41 having positive refractive powers (that is, positive optical powers) in an x direction and a y direction, a first lens array 42 constituted by plural lens cells and having a concave cylindrical lens surface with a negative refractive power in the y direction, and a second lens array 43 constituted by plural lens cells and having a concave cylindrical lens surface with a negative refractive power in the x direction are provided in order from the light source lamp side.

FIG. 17 shows an xz cross-section where the concave cylindrical lens surface of the second lens array 43 has the negative refractive power. FIG. 18 shows a yz cross-section where the concave cylindrical lens surface of the first lens array 42 has the negative refractive power.

A white illumination light flux radiated from a light-emitting tube 1 of a light source lamp LP is collimated by a reflector 2 to become a parallel light flux and then enters the convex lens 41. The parallel light flux entering the convex lens 41 is converged in each of the cross-sections shown in FIGS. 17 and 18. Then, in the cross-sections shown in FIG. 17, the converging light flux passes through the first lens array 42 without change and enters the concave cylindrical lens surface of the second lens array 43.

The converging light flux entering this concave cylindrical lens surface is converted, by the refractive power of the concave cylindrical lens surface set so as to create a substantially afocal state together with the convex lens 41, into a parallel light flux again, that is, compressed.

On the other hand, in the cross-section shown in FIG. 18, the converging light flux from the convex lens 41 enters the concave cylindrical lens surface of the first lens array 42. The converging light flux entering this concave cylindrical lens surface is converted, by the refractive power of the concave cylindrical lens surface set so as to create a substantially afocal state together with the convex lens 41, into a parallel light flux again, that is, compressed.

In addition, the light flux from the convex lens 41 is divided into plural light fluxes by the plural lens cells in the first lens array 3. The plural light fluxes are transmitted through the second lens array 4 and then enter a polarization conversion element 5.

Non-polarized light entering the polarization conversion element 5 is converted into linearly-polarized light having a polarization direction as described in Embodiment 1.

The plural light fluxes emerging from the polarization conversion element 5 are condensed by a condenser lens 6 to be superposed on a reflective liquid crystal panel 8.

Also in this embodiment, the illumination light flux is transmitted through a polarization beam splitting surface 7*a* of a polarization beam splitter 7 to reach the reflective liquid crystal panel 8 as in Embodiment 1.

Light image-modulated by the reflective liquid crystal panel 8 is reflected by the polarization beam splitting surface 7*a*, by which its polarization state is analyzed. The function of a quarter-phase plate 9 is the same as that in Embodiment 1.

The light reflected by the polarization beam splitting surface 7*a* and then emerging from the polarization beam splitter 7 is further analyzed by a polarizing plate 10. The light transmitted through the polarizing plate 10 is projected by a projection lens 11 onto an unshown screen.

Figure 19:
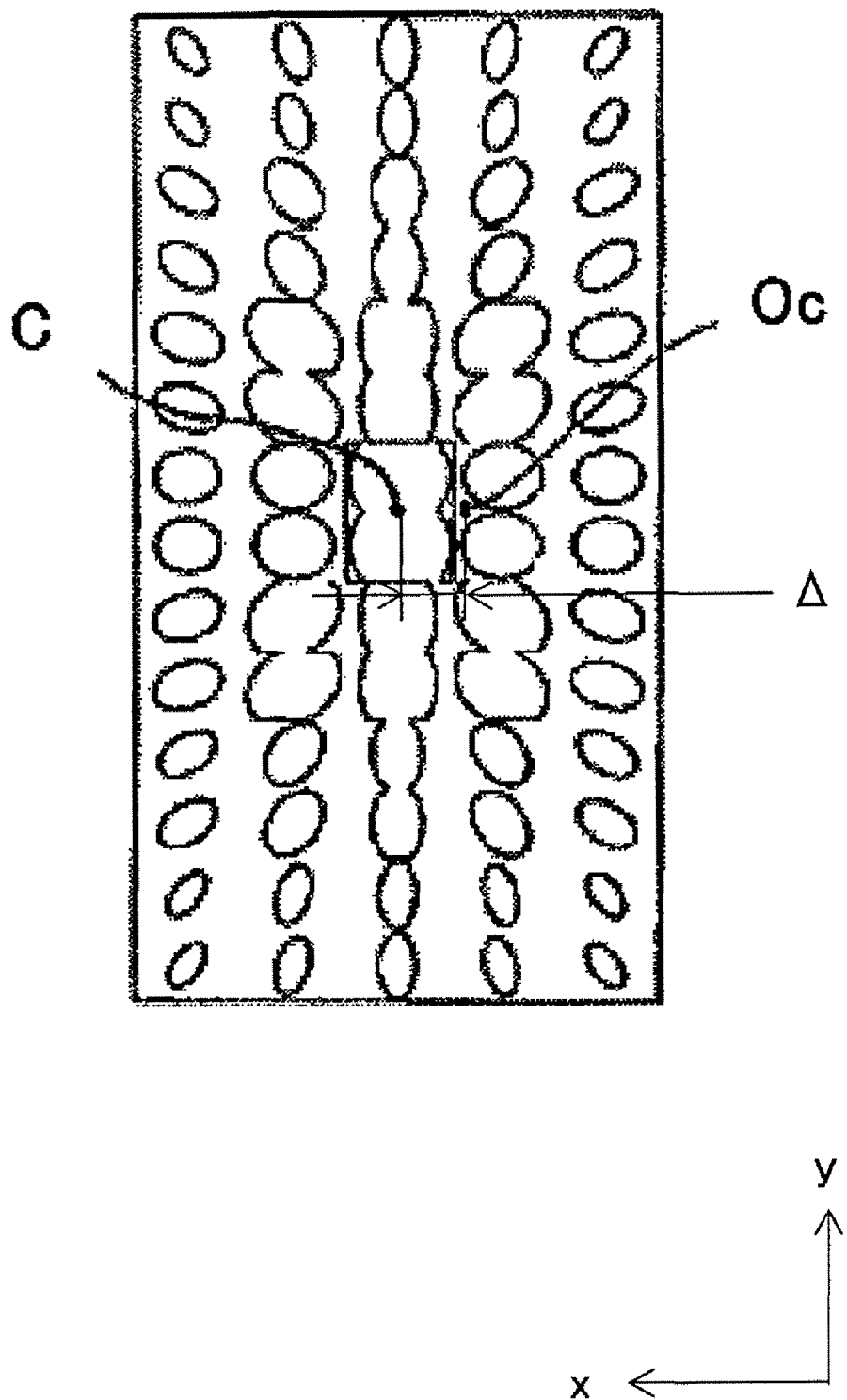
FIG. 19 shows a distribution of light intensity at a polarization conversion element in Embodiment 4.

FIG. 19 shows an intensity distribution of the illumination light on the polarization conversion element 5. The illumination light converged by the convex lens 41 is divided into plural light fluxes by the first lens array 3, then converted into parallel light fluxes by the first and second lens arrays 3, 4 and further divided by the polarization conversion element 5. As a result, on the polarization conversion element 5 an intensity distribution of the illumination light in which plural flattened light source images are distributed is obtained.

Also in this embodiment as shown in FIG. 17, an optical system portion from the light source lamp LP (that is, from the reflector 2) to the polarization conversion element 5 is shifted, that is, decentered by a predetermined amount respect to an optical system portion including the condenser lens 6, the polarization beam splitter 7 (or the polarization beam splitting surface 7*a*) and subsequent optical elements including the reflective liquid crystal panel 8. This can cause a barycenter C of the intensity distribution of the illumination light flux on the polarization conversion element 5 to shift an optical axis Oc of the condenser lens 6.

The light flux converges toward an arbitrary point on the panel surface 8*a* in a state in which its intensity distribution on the polarization conversion element 5 is converted into an angular intensity distribution. Therefore, a barycenter direction is inclined in the x direction with respect to a normal to the panel surface 8*a*.

As described above, in this embodiment, the angular intensity distribution of the illumination light flux is flattened by the convex lens 41 and the concave cylindrical lens surfaces integrally formed on the first and second lens arrays 3 and 4. Further, the optical system portion from the reflector 2 to the polarization conversion element 5 is shifted by the to the optical system portion including the condenser lens 6 and the subsequent optical elements.

This can bias an angular intensity barycenter of the light flux converging toward an arbitrary point on the panel surface 8*a* in the x direction with respect to the normal to the panel surface 8*a* at the arbitrary point. In other words, this can incline a barycenter direction with respect to the normal to the panel surface 8a, thereby enabling to adjust the intensity distribution of the light flux from the illumination optical system to the light-analyzing characteristic in FIG. 7.

Figure 20:
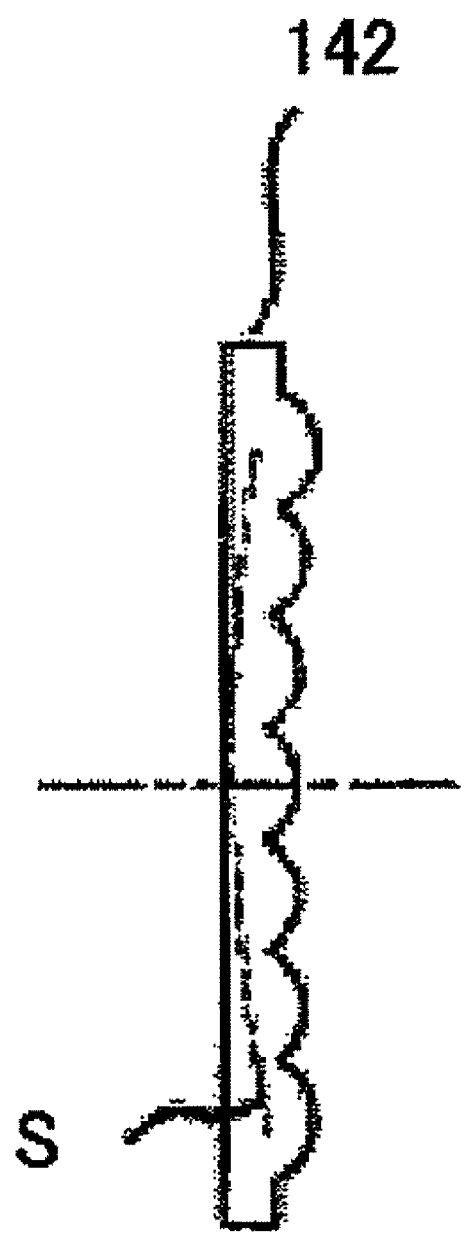
FIG. 20 shows a modified example of a lens array of Embodiment 4.

Although the plural lens cells and the concave cylindrical lens surface are formed on different surfaces in each lens array in this embodiment, a lens array 142 may be used in which plural lens cells and a concave cylindrical lens surface are formed on the same surface as shown in FIG. 20. Specifically, the center of each lens cell of the lens array 142 is located on a concave surface S.

Further, although this embodiment uses the reflector 2 having a parabolic surface and converges the illumination light flux by using the convex lens 41, a reflector with an elliptic shape can be used to eliminate the convex lens 41.

Embodiment 5

Figure 21:
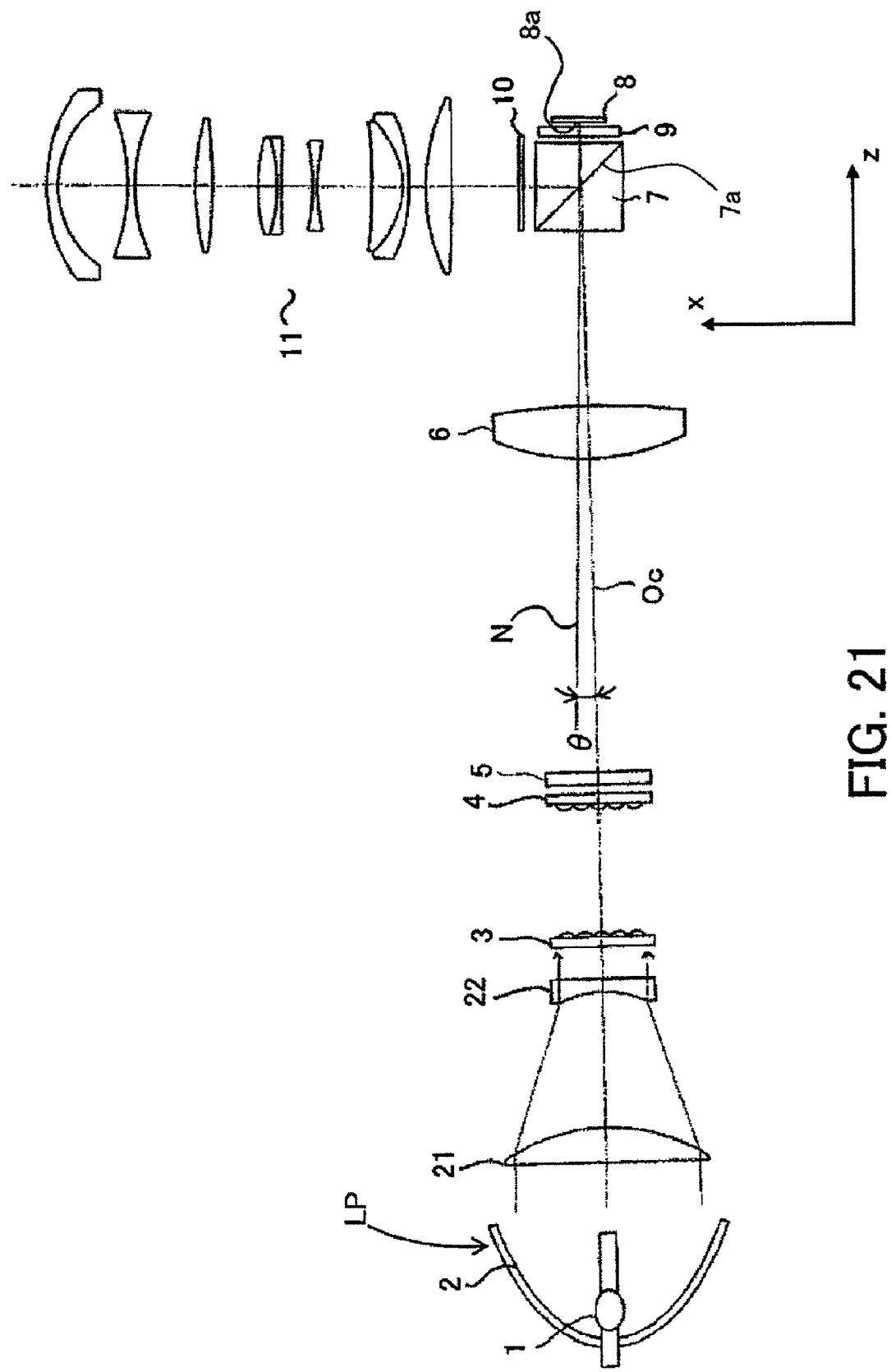
FIG. 21 shows an xz cross-section of an optical system for image projection that is Embodiment 5 of the present invention.

FIG. 21 shows the configuration in an xz cross-section of an optical system for image projection that is Embodiment 5 of the present invention. This embodiment is a modified example, and the elements identical to those described in Embodiment 2 are designated with the same reference numerals.

This embodiment is different from Embodiment 2 in that the entire illumination optical system (from the light source lamp LP to the condenser lens 6 in this embodiment) is inclined with respect to a normal N to the reflective liquid crystal panel 8 (that is, the ection.

This can bias the angular intensity barycenter of the light flux converging toward an arbitrary point on the panel surface 8a in the x direction with respect to the normal N to the panel surface 8a at the arbitrary point. In other words, this can incline the barycenter direction with respect to the normal N to the panel surface 8a, thereby enabling to adjust the intensity distribution of the light flux from the illumination optical system to the light-analyzing characteristic in FIG. 7, as in each of the above-described embodiments.

Embodiment 6

In each of the above-described embodiments, the description was made of the case where the illumination light flux from the light source is transmitted through the polarization beam splitter (that is, the polarization beam splitting surface) to be introduced to the reflective liquid crystal panel and the light flux (that is, the projection light) reflected by the reflective liquid crystal panel is reflected by the polarization beam splitter to be introduced to the projection lens.

Figure 22:
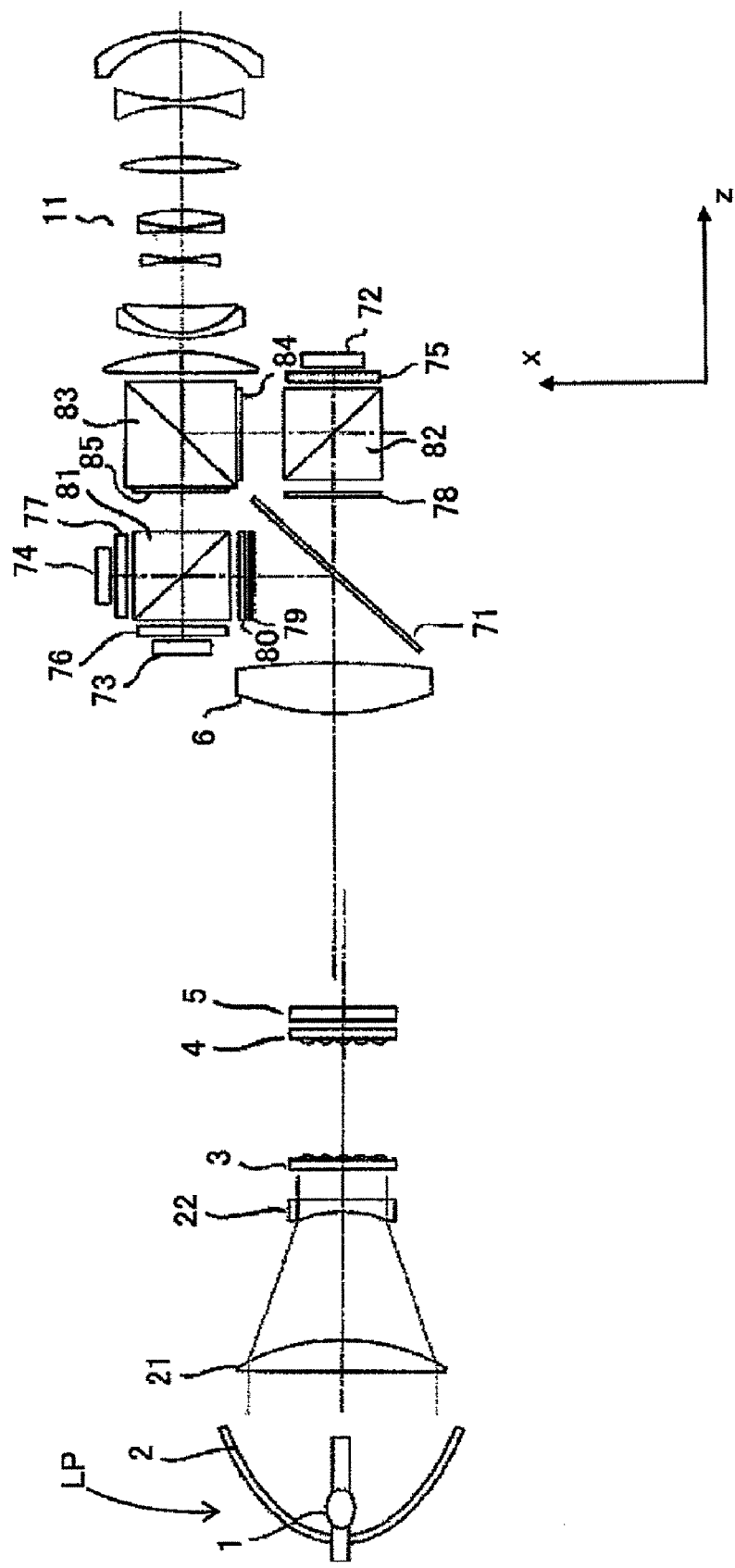
FIG. 22 shows an xz cross-section of an optical system for image projection that is Embodiment 6 of the present invention.

However, as an alternative embodiment of the present invention, a configuration shown in FIG. 22 may be employed in which an illumination light flux is reflected by a polarization beam splitter to be introduced to a reflective liquid crystal panel and a light flux reflected by the reflective liquid crystal panel is transmitted through the polarization beam splitter to be introduced to a projection lens. In addition, the polarizing plate described in each of the above-described embodiments may be provided on both an illumination optical system side and a projection lens side.

Further, in each of the above-described embodiments, the description was made of the case where only one reflective liquid crystal panel is provided. However, as shown in FIG. 22, three liquid crystal panels may be provided.

FIG. 22 show the configuration of an optical system for image projection that is Embodiment 6 of the present invention which includes three liquid crystal panels and the illumination optical system described in Embodiment 2.

On the side closer to the projection lens 11 than the condenser lens 6, reference numeral 71 shows a dichroic mirror which transmits green (G) light and reflects red (R) light and blue (B) light. Reference numerals 72, 73 and 74 show liquid crystal panels for G, R and B, respectively. Reference numerals 75, 76 and 77 show quarter-phase plates for G, R and B, respectively, which correspond to the quarter-phase plate 9 described in Embodiments 1 and 2.

Reference numeral 81 shows a first polarization beam splitter which reflects the R light toward the liquid crystal panel 73 for R (hereinafter referred to as the R panel) depending on its polarization direction and transmits the B light toward the liquid crystal panel 74 for B (hereinafter referred to as the B panel) depending on its polarization direction. The first polarization beam splitter combines the R light and B light respectively reflected by the R and B panels 73 and 74.

Reference numeral 82 shows a second polarization beam splitter which transmits the G light toward the liquid crystal panel 72 for G (hereinafter referred to as the G panel) and reflects the G light reflected by the G panel 72.

Reference numeral 78 shows a first polarizing plate, and 79 a second polarizing plate. Reference numeral 78 shows a color-selective phase plate which rotates the polarization direction of the R light by 90 degrees and does not convert the polarization direction of the B light. Reference numeral 84 shows a third polarizing plate, 85 a fourth polarizing plate.

Reference numeral 83 shows a color combining prism which transmits the R light and B light from the first polarization beam splitter 81 and reflects the G light from the second polarization beam splitter 82. The color-combining prism 83 combines the R light, B light and G light to introduce them to the projection lens 11.

According to each of the above-described embodiments, the barycenter of the angular intensity distribution of the light flux illuminating the reflective image-forming element can be biased in the first cross-section. This enables to reduce the amount of the leakage light from the polarization beam splitting surface while suppressing reduction of the amount of light. Therefore, the optical system can project a bright image with high contrast.

In each of the above-described embodiments, the description was made of the case of using the liquid crystal panel. However, an alternative embodiment of the present invention may use other reflective image-forming elements such as a DMD (digital micro mirror device).

Furthermore, the present invention is not limited to these preferred embodiments and various variations and modifications may be made without departing from the scope of the present invention.

This application claims foreign priority benefits based on Japanese Patent Applications Nos. 2006-159999, filed on Jun. 8, 2006, and 2007-150813, filed on Jun. 6, 2007, and each of which is hereby incorporated by reference herein in its entirety as if fully set forth herein.

What is claimed is:

1. An optical system for image projection comprising:
a converging optical system which converges a light flux from a light source toward a reflective image-forming element; and
a polarization beam splitting surface which transmits an incoming light flux having a first polarization direction, of the light flux from the converging optical system, to introduce it to the reflective image-forming element and causes light having a second polarization direction perpendicular to the first polarization direction, of an outgoing light flux from the reflective image-forming element, to proceed to a projection optical system, wherein the converging optical system includes a lens array which divides the light flux from the light source into plural light fluxes,
a polarization conversion element which converts non-polarized light from the lens array into linearly-polarized light having a certain polarization direction and
a condenser lens which superposes the plural light fluxes from the polarization conversion element on the reflective image-forming element, and
wherein, in a first cross-section which is parallel to a normal to the polarization beam splitting surface and a normal to an entrance/emergence surface of the reflective image-forming element,
the converging optical system has a configuration which causes an incident angle on the polarization beam splitting surface of a light ray passing through a barycenter of intensity distribution of the outgoing light flux to be larger than an incident angle on the polarization beam splitting surface of a light ray passing through a barycenter of intensity distribution of the incoming light flux, the configuration being one of a configuration in which the lens array and the polarization conversion element are decentered with respect to the condenser lens, the polarization beam splitting surface and the reflective image-forming element and a configuration in which the lens array and the polarization conversion element are inclined with respect to the normal to the entrance/emergence surface.

2. An optical system according to claim 1, wherein the following condition is satisfied:

$$1° \leq \alpha \leq 3°$$

where α represents an angle formed by a direction in which the barycenter of the incoming light flux converging toward the entrance point and the normal to the entrance/emergence surface at the entrance point.

3. An optical system according to claim 1, wherein the following condition is satisfied:

$$\theta 1 < \theta 2$$

where θ1 represents a convergent angle of the incoming light flux converging toward an entrance point in the first cross-section, and θ2 represents a convergent angle of the incoming light flux in a second cross-section perpendicular to the first cross-section and parallel to the normal to the entrance/emergence surface.

4. An optical system according to claim 3, wherein the following condition is further satisfied:

$$0.6 < \theta 1/\theta 2 < 0.9.$$

5. An optical system according to claim 1, wherein
plural optical elements, each of which has different optical powers in the first cross-section and in a second cross-section perpendicular to the first cross-section and parallel to the normal to the entrance/emergence surface, are provided between the light source and the condenser lens.

6. An optical system according to claim 1, wherein
the converging optical system includes an aperture stop which is provided between the light source and the condenser lens, and
the aperture stop is decentered with respect to an optical axis of the condenser lens in the first cross-section.

7. An image projection apparatus comprising an optical system according to claim 1.

8. An image display system comprising:
an image projection apparatus according to claim 7; and
an image supply apparatus which supplies image information to the image projection apparatus.

9. An optical system for image projection comprising:
a converging optical system which converges a light flux from a light source toward a reflective image-forming element; and
a polarization beam splitting surface which transmits an incoming light flux having a first polarization direction, of the light flux from the converging optical system, to introduce it to the reflective image-forming element and causes light having a second polarization direction perpendicular to the first polarization direction, of an outgoing light flux from the reflective image-forming element, to proceed to a projection optical system,
wherein the converging optical system includes a lens array which divides the light flux from the light source into plural light fluxes,
a polarization conversion element which converts non-polarized light from the lens array into linearly-polarized light having a certain polarization direction and
a condenser lens which superposes the plural light fluxes from the polarization conversion element on the reflective image-forming element, and
wherein, in a first cross-section which is parallel to a normal to the polarization beam splitting surface and a normal to an entrance/emergence surface of the reflective image-forming element,
the converging optical system has a configuration which causes an incident angle on the polarization beam splitting surface of a light ray passing through a barycenter of intensity distribution of the outgoing light flux to be larger than an incident angle on the polarization beam splitting surface of a light ray passing through a barycenter of intensity distribution of the incoming light flux, the configuration being one of a configuration in which the lens array and the polarization conversion element are decentered with respect to the condenser lens, the polarization beam splitting surface and the reflective image-forming element and a configuration in which the lens array and the polarization conversion element are inclined with respect to the normal to the entrance/emergence surface; and
wherein a polarization direction of the linearly-polarized light entering into the polarization beam splitting surface is a p-polarized direction with respect to the polarization beam splitting surface.

* * * * *